United States Patent
Bieganski (12)

(10) Patent No.: US 6,321,221 B1
(45) Date of Patent: Nov. 20, 2001

(54) SYSTEM, METHOD AND ARTICLE OF MANUFACTURE FOR INCREASING THE USER VALUE OF RECOMMENDATIONS

(75) Inventor: Paul Bieganski, Minneapolis, MN (US)

(73) Assignee: Net Perceptions, Inc., Minneapolis, MN (US)

( * ) Notice: Subject to any disclaimer, the term of this patent is extended or adjusted under 35 U.S.C. 154(b) by 0 days.

(21) Appl. No.: 09/118,025

(22) Filed: Jul. 17, 1998

(51) Int. Cl.[7] .............................. G06F 17/30; G06F 17/60
(52) U.S. Cl. ..................................... 707/5; 705/10; 705/27
(58) Field of Search .............................. 707/4, 5; 705/10, 705/27

(56) References Cited

U.S. PATENT DOCUMENTS

| | | | |
|---|---|---|---|
| 4,996,642 | 2/1991 | Hey | 705/27 |
| 5,201,010 | 4/1993 | Deaton et al. | 382/139 |
| 5,311,424 | 5/1994 | Mukherjee et al. | 705/29 |
| 5,353,219 | 10/1994 | Mueller et al. | 705/16 |
| 5,383,111 | 1/1995 | Homma et al. | 705/27 |
| 5,459,306 | 10/1995 | Stein et al. | 235/383 |
| 5,515,269 | 5/1996 | Willis et al. | 705/29 |
| 5,704,017 | 12/1997 | Heckerman et al. | 706/12 |

(List continued on next page.)

FOREIGN PATENT DOCUMENTS

| | | |
|---|---|---|
| 0 643 359 A2 | 5/1994 | (EP) . |
| 0 751 471 A1 | 1/1997 | (EP) . |

(List continued on next page.)

OTHER PUBLICATIONS

Avery, C. et al., "Recommender Systems for Evaluating Computer Messages", *Communications of the ACM*, 40(3):88–89 (Mar. 1997).

Balabonovic, M. et al., "Fab: Content–Based, Collaborative Recommendation", *Communications of the ACM*, 40(3):66–72 (Mar. 1997).

(List continued on next page.)

*Primary Examiner*—Kenneth R. Coulter
(74) *Attorney, Agent, or Firm*—Finnegan, Henderson, Farabow, Garrett & Dunner, L.L.P.

(57) ABSTRACT

The invention includes a system, method and article of manufacture for generating a serendipity-weighted recommendation output set to a user based, at least in part, on a serendipity function. The system includes a processing system of one or more processors configured to receive applicable data that includes item recommendation data and community item popularity data. The processing system is also configured to produce a set of item serendipity control values in response to the serendipity function and the community item popularity data, and to combine the item recommendation data with the set of item serendipity control values to produce a serendipity-weighted and filtered recommendation output set. The method includes receiving applicable data by the processing system, including inputting item recommendation data and community item popularity data. The method further includes generating a set of item serendipity control values in response to the community item popularity data and a serendipity function, using the processing system, and combining the item recommendation data and the set of item serendipity control values to produce a serendipity-weighted and filtered item recommendation output set, also using the processing system. The invention also includes a computer readable medium having a having a set of program instructions physically embodied thereon, executable by a computer, to perform a method similar to the method described above.

61 Claims, 17 Drawing Sheets

U.S. PATENT DOCUMENTS

| | | | |
|---|---|---|---|
| 5,749,081 | 5/1998 | Whiteis | 707/102 |
| 5,768,142 | 6/1998 | Jacobs | 700/231 |
| 5,794,209 | 8/1998 | Agrawal et al. | 705/10 |
| 5,825,651 | 10/1998 | Gupta et al. | 700/103 |
| 5,842,199 | 11/1998 | Miller et al. | 707/2 |
| 5,876,799 * | 2/1999 | Lang et al. | 707/1 |
| 5,974,396 | 10/1999 | Anderson et al. | 705/10 |
| 6,006,218 * | 12/1999 | Breese et al. | 707/3 |
| 6,016,475 | 1/2000 | Miller et al. | 705/1 |
| 6,018,738 * | 1/2000 | Breese et al. | 707/100 |
| 6,041,311 * | 3/2000 | Chislenko et al. | 705/27 |
| 6,049,777 * | 4/2000 | Sheena et al. | 705/10 |
| 6,064,980 * | 5/2000 | Jacobi et al. | 705/26 |
| 6,092,049 * | 7/2000 | Chislenko et al. | 705/10 |
| 6,108,493 | 8/2000 | Miller | 709/219 |
| 6,112,186 * | 8/2000 | Bergh et al. | 705/10 |
| 6,119,101 | 9/2000 | Peckover | 705/26 |

FOREIGN PATENT DOCUMENTS

| | | |
|---|---|---|
| 7-152771 | 6/1995 | (JP) . |
| 7-234881 | 9/1995 | (JP) . |
| 8-331077 | 12/1996 | (JP) . |
| 9-153027 | 6/1997 | (JP) . |
| 9-265478 | 10/1997 | (JP) . |
| 10-32797 | 2/1998 | (JP) . |
| 10-63680 | 3/1998 | (JP) . |
| 10-63681 | 3/1998 | (JP) . |
| 10-63749 | 3/1998 | (JP) . |
| 10-74206 | 3/1998 | (JP) . |
| 10-91642 | 4/1998 | (JP) . |
| 10-91647 | 4/1998 | (JP) . |
| 10-91686 | 4/1998 | (JP) . |
| 10-143540 | 5/1998 | (JP) . |
| 10-143541 | 5/1998 | (JP) . |
| 10-162025 | 6/1998 | (JP) . |
| 10-162027 | 6/1998 | (JP) . |
| 10-162028 | 6/1998 | (JP) . |
| 10-198706 | 7/1998 | (JP) . |
| 10-228482 | 8/1998 | (JP) . |
| 10-228487 | 8/1998 | (JP) . |
| 10-240749 | 9/1998 | (JP) . |
| 10-247198 | 9/1998 | (JP) . |
| 10-257405 | 9/1998 | (JP) . |
| 10-260955 | 9/1998 | (JP) . |
| 10-283403 | 10/1998 | (JP) . |
| 10-289245 | 10/1998 | (JP) . |
| 10-301950 | 11/1998 | (JP) . |
| 10-307845 | 11/1998 | (JP) . |
| 10-320415 | 12/1998 | (JP) . |
| 10-340270 | 12/1998 | (JP) . |
| 11-15840 | 1/1999 | (JP) . |
| 11-7453 | 1/1999 | (JP) . |
| 11-7472 | 1/1999 | (JP) . |
| 11-45265 | 2/1999 | (JP) . |
| 11-45284 | 2/1999 | (JP) . |
| 11-45286 | 2/1999 | (JP) . |
| 11-45289 | 2/1999 | (JP) . |
| 11-45290 | 2/1999 | (JP) . |
| 11-53394 | 2/1999 | (JP) . |
| 11-66081 | 3/1999 | (JP) . |
| 11-66097 | 3/1999 | (JP) . |
| 11-66098 | 3/1999 | (JP) . |
| 11-110410 | 4/1999 | (JP) . |
| 11-120189 | 4/1999 | (JP) . |
| 11-96164 | 4/1999 | (JP) . |
| 11-134345 | 5/1999 | (JP) . |
| 11-134361 | 5/1999 | (JP) . |
| 11-143900 | 5/1999 | (JP) . |
| 11-161670 | 6/1999 | (JP) . |
| 11-164217 | 6/1999 | (JP) . |
| 11-175546 | 7/1999 | (JP) . |
| 11-184890 | 7/1999 | (JP) . |
| 11-184891 | 7/1999 | (JP) . |
| 11-195035 | 7/1999 | (JP) . |
| 11-205706 | 7/1999 | (JP) . |
| 11-212996 | 8/1999 | (JP) . |
| 11-232278 | 8/1999 | (JP) . |
| 11-232287 | 8/1999 | (JP) . |
| 11-509019 | 8/1999 | (JP) . |
| 11-250091 | 9/1999 | (JP) . |
| 11-259497 | 9/1999 | (JP) . |
| 11-272574 | 10/1999 | (JP) . |
| 11-282874 | 10/1999 | (JP) . |
| 11-282875 | 10/1999 | (JP) . |
| 11-308547 | 11/1999 | (JP) . |
| 11-312177 | 11/1999 | (JP) . |
| 11-316759 | 11/1999 | (JP) . |
| 11-328266 | 11/1999 | (JP) . |
| 11-338869 | 12/1999 | (JP) . |
| 11-338872 | 12/1999 | (JP) . |
| 11-338879 | 12/1999 | (JP) . |
| 11-345446 | 12/1999 | (JP) . |
| 12-13708 | 1/2000 | (JP) . |
| 12-23112 | 1/2000 | (JP) . |
| 12-48046 | 2/2000 | (JP) . |
| 12-57090 | 2/2000 | (JP) . |
| WO97 26729 | 7/1997 | (WO) . |
| WO98 02835 | 1/1998 | (WO) . |
| WO 98/33135 | 7/1998 | (WO) . |

OTHER PUBLICATIONS

Borchers, A. et al., "Ganging up on Information Overload", *Computer*, pp. 106–108 (Apr. 1998).

Kautz, H. et al., "Referral Web: Combining Social Networks and Collaborative Filtering", *Communications of the ACM*, 40(3):63–65 (Mar. 1997).

Konstan, J. et al., "GroupLens: Applying Collaborative Filtering to Usenet News", *Communications of the ACM*, 40(3):77–87 (Mar. 1997).

Miller, B. et al., "Experiences with GroupLens: Making Usenet Useful Again", 1997 Annual Technical Conference, 219–233 (1997).

Resnick, P. et al., "GroupLens: An Open Architecture for Collaborative Filtering of Netnews", Proceedings of the 1994 Computer Supported Collaborative Work Conference, 13 pages (1994).

Resnick, P. et al., "Recommender Systems", *Communications of the ACM*, 40(3):56–58 (Mar. 1997).

Rucker, J. et al., "Siteseer: Personalized Navigation for the Web", *Communications of the ACM*, 40(3)73–76 (Mar. 1997).

Shardanand, U. et al., "Social Information Filtering: Algorithms for Automating 'Word of Mouth'", Chi '95 Conference Proceedings on Human Factors in Computing Systems, 210–216 (May 7–11, 1995).

Terveen, L. et al., "Phoaks: A System for Sharing Recommendations", *Communications of the ACM*, 40(3):59–62 (Mar. 1997).

Dragan et al., "Advice from the Web," PC Magazine, v16, n15 p. 133(7), Sep. 1997.

Tsang et al. "An Object Oriented Intelligent Tourist Advisor System," Intelligent Information Systems, 1996, Australian and New Zealand Conference, pp. 6–9, Nov. 1996.

Montani et al., "A Case-based Reasoning System for Diabetic Patient Therapy," Proceedings on the Third International Conference on Neural Networks and Expert Systems in Medicine Healthcare, pp. 160–168, Sep. 1998.

Langley et al., "Applications of Machine Learning and Rule Induction," Communications of the ACM, v38, n11, pp. 54–64, Nov. 1995.

Cox, "How a Machine Reasons: Part 8 (How rules are stored and executed in rule-based systems)", AI Expert, v8, n3, page 13(4), Mar. 1993.

Locke, "Intelligent Agents Create Dumb Users (?)," Online & CDROM Review, Learned Information Europe, UK, v21, n6, pp. 369–372, Dec. 1997.

* cited by examiner

SYSTEM, METHOD AND ARTICLE OF MANUFACTURE FOR INCREASING THE USER VALUE OF RECOMMENDATIONS

RELATED APPLICATIONS

This application is related to the following U.S. patent applications, which are incorporated by reference:
1. SYSTEM, METHOD AND ARTICLE OF MANUFACTURE FOR UTILIZING IMPLICIT RATINGS IN COLLABORATIVE FILTERS, now U.S. Pat. No. 6,108,493, filed Oct. 7, 1996, Ser. No. 08/725,580. 1996,Ser. No. 08/725,580 now U.S. Pat. No. 6,108,493.
2. SYSTEM, METHOD, AND ARTICLE OF MANUFACTURE FOR GENERATING IMPLICIT RATINGS BASED ON RECEIVER OPERATING CURVES, filed Oct. 8, 1996, Ser. No. 08/729,787 now U.S. Pat. No. 6,016,475.
3. SYSTEM, METHOD AND ARTICLE OF MANUFACTURE FOR USING RECEIVER OPERATING CURVES TO EVALUATE PREDICTIVE UTILITY, filed Oct. 18, 1996, Ser. No. 08/733,806 now U.S. Pat. No. 5,842,199.
4. SYSTEM, METHOD AND ARTICLE OF MANUFACTURE FOR MAKING SERENDIPITY-WEIGHTED RECOMMENDATIONS TO A USER, filed Jul. 17, 1998, Ser. No. 09/118,026.

BACKGROUND

The present invention relates generally to data processing systems, and more particularly, collaborative filtering and recommender systems.

Recommender systems predict the preferences of users based on attributes known about the user or a past history of preferences or consumption by the user. For example, a recommender system may predict that a user will like the movie "Titanic" because he previously indicated a liking for such other epic movies as "Lawrence of Arabia" or "Ben Hur".

It is important for recommender systems to consider quality as well as content of items being recommended. However, there exists no reliable computerized process for estimating the quality of the content of most items that are the subject of a recommender system, especially non-textual multimedia content such as movies and videos. For example, a computer program cannot tell if a remade version of the movie Casablanca is well done or not? Collaborative filtering technology allows recommender systems to provide recommendations based on both content and quality by making recommendations using quality and content judgments made by other users, not by automated computer analysis of content. By pooling together the preferences evinced by a community of users, collaborative filtering allows that user community to share the preferences anonymously in a large scale manner. A prediction of one user's preference for an item is computed by considering other people's preferences for that item, where those other people are chosen based on how similar their interests and expectations are to the user's. For example, a user might be given a high prediction for the movie "Sense and Sensibility," because other users, in the community who shared the user's taste in Jane Austen movies thought "Sense and Sensibility" was a good movie.

A recommender system determines its recommendations by examining previous user preference data. The preference data can be unary or numerically valued. Unary preference data is a set of customer-item pairs: a customer-item pair indicates that an event linking the customer to the item has occurred. No additional preference information is available to the recommender system about the a user-item event except that it happened. The non-existence of a customer-item pair (more generally known as a tuple) for a specific customer-item pair does not indicate a preference: it only indicates a lack of information. An example of unary customer data is purchase record data where a customer-item pair indicates that the customer has purchased the indicated item. Another example of unary data is contained in web page logs, where a customer-item pair indicates that the customer has visited a specific web page.

Binary and numerically valued preference data are generally in the form of a 3-tuples, where the three elements of the tuple are customer identifier, item identifier, and preference value. The preference value indicates, for example, the strength of the user's preference for the item or whether the user's preference is either for or against the item. To illustrate, where the preference is represented in binary form, a "0" may mean a preference against an item while a "1" means a preference for the item. Where the preference is presented as numerically valued data, the data value may represent a one-dimensional axis of preference, with the midpoint indicating an ambivalent preference for the item, a low value indicating a strong dislike for the item, and a high value indicating a strong preference for the item.

Preference data may be presented to the recommender system in explicit or implicit form. Explicit preference data are preference values that a user has supplied directly, for example by filling out a survey. Implicit preference data consist of preference values that have been inferred by observing actions that the user has taken. It can be inferred that the user has some preference for the item that she has just bought, although the act of purchasing the item is not an explicit statement of preference per se. A user's preference for a web page may be inferred, for example, by measuring the amount of time that the user spends reading the web page, or the number of times the user returns to that page.

The inputs to a recommender system are typically preference values as described above. The outputs of the recommender system are predictions of preference values for items, particularly those for which the user has not already indicated a preference. Like the input values, the output preferences may be unary, binary, or numerically valued. A system that outputs unary recommendations predicts items that will be of interest to the user, but does not attempt to predict the strength of a user's preference for each item. Binary predictions indicate items that are likely to be of high preference to the user and items that are likely to be of low preference, but again cannot provide an estimate of preference strength. Numerically valued preferences indicate a preference for or against the item and also indicate the preference strength. Note that the domain of the preference input may be different from the domain of the output preference predictions. For example, the preference input may be unary, while the output preference predictions may be numerically valued.

While unary and binary preference values do not indicate the strength of the preference, some recommender systems may additionally rank the preference predictions being returned such that the highest rank predictions have the largest probability of being correct. Numerically valued items are implicitly ranked.

Existing recommender systems generate recommendations by selecting the highest-ranking positive preference values. However, this technique does not always provide a desirable effect. In many cases, if the recommender system has sufficient data to have high confidence that a recommendation will be good, then the recommendation will be obvious to the user. If the recommendation is obvious, then the recommender system has provided no value. For example, in the context of a system that recommends items to a user for purchase at a grocery store, the recommender system may determine that it is most likely that the user will be interested in purchasing milk, and therefore will recommend that the customer purchase milk. However, a large fraction of grocery store shoppers buy milk, even without being recommended to do so, and so, making a recommendation to purchase milk is obvious. Thus, making such a recommendation to the customer is not very helpful. In spite of being an accurate recommendation, it is not a useful, or valuable, recommendation, since it does not provide the customer with knowledge that he did not already have.

Therefore, there exists a problem with existing recommender systems that, although able to recommend items with high confidence level, often recommend items that are obvious to the user. Consequently, the value of the recommendation is low. There exists a need to overcome the problem of making low value recommendations.

SUMMARY OF THE INVENTION

To address the problems listed above, the present invention is directed to weighting and filtering the recommendations received from a recommender system. In particular, the invention is directed to an electronic processing system for generating a serendipity-weighted recommendation output set to a user based, at least in part, on a serendipity function. The system includes a processing system of one or more processors configured to receive applicable data that includes item recommendation data and community item popularity data. The processing system is also configured to produce a set of item serendipity control values in response to the serendipity function and the community item popularity data, and to combine the item recommendation data with the set of item serendipity control values to produce a serendipity-weighted and filtered recommendation output set.

In another embodiment, the invention is directed to a method of producing a serendipity-weighted recommendation to a user, where the method uses a computer having a memory unit, a processing system having one or more processors and an input/output interface. The method includes receiving applicable data by the processing system, including inputting item recommendation data and community item popularity data. The method further includes generating a set of item serendipity control values in response to the community item popularity data and a serendipity function, using the processing system, and combining the item recommendation data and the set of item serendipity control values to produce a serendipity-weighted and filtered item recommendation output set, also using the processing system.

In another embodiment, the invention is directed to a computer-readable program storage device, having a set of program instructions physically embodied thereon, executable by a computer, to perform a method for increasing user value of an item recommendation from a recommender system. The method includes receiving applicable data including item recommendation data and community item popularity data. The method also includes generating a set of item serendipity control values in response to the community item popularity data and a serendipity function; and combining the item recommendation data and the set of item serendipity control values to produce a serendipity-weighted and filtered item recommendation output set.

The above summary of the present invention is not intended to describe each illustrated embodiment or every implementation of the present invention. Other features of the invention, together with a fuller understanding of the invention will become apparent and appreciated by referring to the following description and claims taken in conjunction with the accompanying drawings.

BRIEF DESCRIPTION OF THE DRAWINGS

The invention may be more completely understood in consideration of the following detailed description of various embodiments of the invention in connection with the accompanying drawings, in which:

FIGS. 6A–6E illustrate a number of different serendipity control functions;

DETAILED DESCRIPTION

Present recommenders focus on making accurate recommendations. However, the most accurate recommendations may be those recommendations that are obvious, having low value to the user. For example, a recommender having access to data regarding a user's preference for books may have realized that the user enjoys high-tech military dramas. Therefore, it would be obvious to recommend that the user read a new release by, for example, Tom Clancy. However, such a recommendation would most likely be useless to the user, since Clancy is a very popular author and there is a high probability that the user already knew of the recent Clancy release independently of the recommendation. In this case, the recommender adds little value to a user's book selection or to a (virtual) bookstore's ability to serve the user.

The recommender typically has higher value for both the user and the service provider if the item recommended to the user is not known to the user, but is still liked by the user. Thus, a desirable characteristic of recommender systems is known as serendipity. Serendipity occurs when a user makes a pleasant discovery that would not normally have been made. A serendipitous recommender system is a recommender system that has the characteristic of providing recommendations that a user would not normally have come across. However, since existing recommender systems focus on providing accurate recommendations, the user is often presented with an obvious recommendation, and not a serendipitous one. The invention described and claimed below is useful for improving the user value of recommendations received from recommender systems. The present invention may be used to serendipity-weight and filter the recommendations from the recommender system so as to produce serendipitous recommendations, and may operate under real-time to provide fast interaction with the user or customer. The invention may be added to existing recommender systems to improve the value of the recommendations provided to the user.

It is important to note that, although much of the description contained herein is related to recommendations received from a recommender system, the invention is not limited to serendipity-weighting and filtering recommendations provided by a recommender system. The user may receive recommendations from a wide range of sources, including, but limited to, population measures, community popularity data, expert opinions, such as film recommendations made by a film critic or restaurant critic, expert ratings, such as are provided in a Michelin guide concerning hotels, and even from other individuals.

Figure 1:
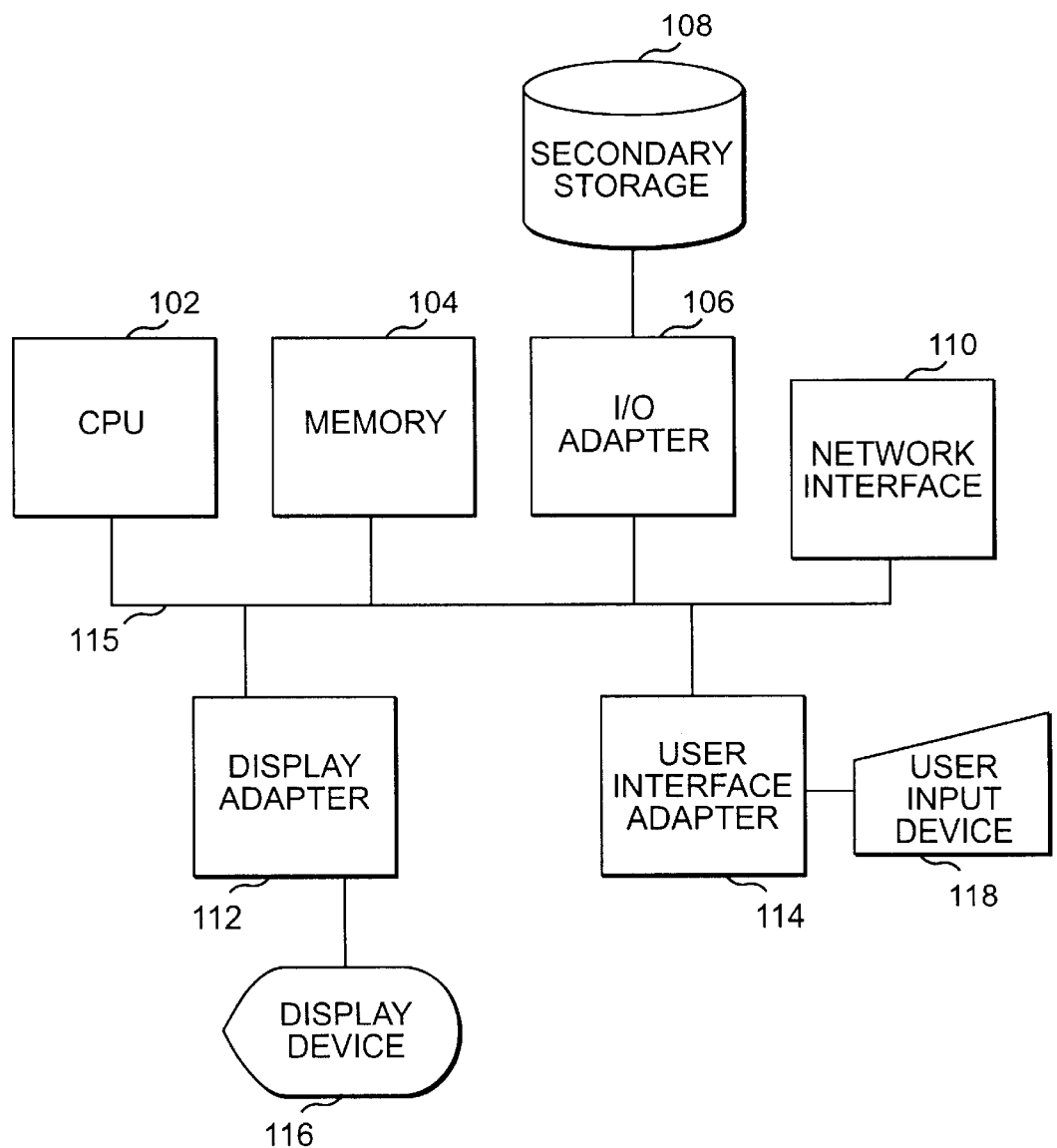
FIG. 1 illustrates a computer system for use with an embodiment of the present invention.

FIG. 1 shows a diagram of a typical computer system suitable for practicing the present invention. The computer may include a system of one or more central processing units (CPUs) 102, a memory system 104, an input/output (I/O) adapter 106, a secondary storage 108, a network interface 110, a user interface adapter 114, and a display adapter 112. All of the computer components are connected by a system bus 115. The display adapter 112 may be connected to a display 116 for displaying a recommendation to a user. The user interface adapter 114 may be connected to a user input device 118.

The computer system may include more than one processor, where the processors are in different locations. In such a case, the processors may be linked by input/output interfaces over a network, such as a local area network, wide area network or the Internet.

Figure 2:
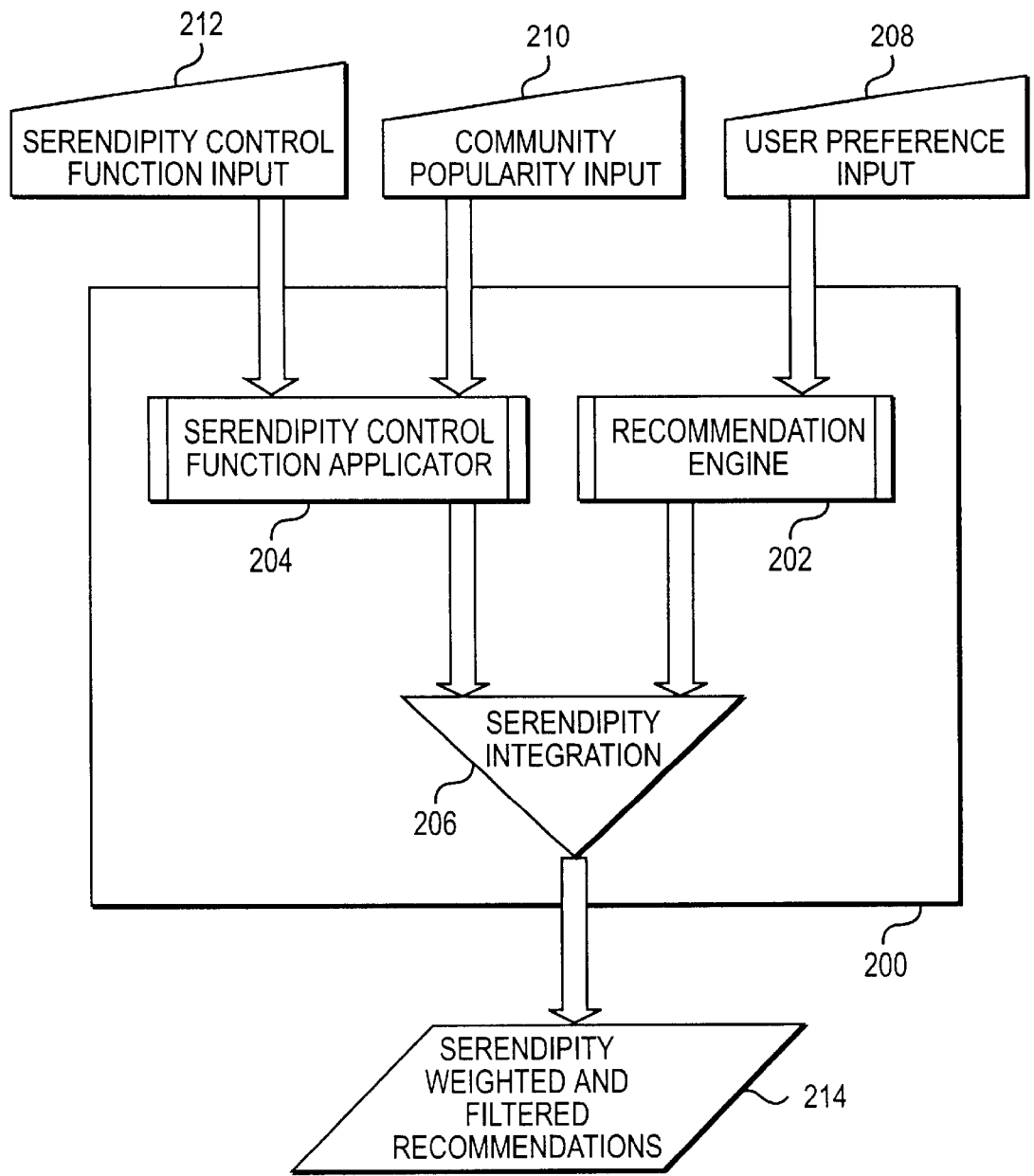
FIG. 2 illustrates a system for generating serendipity-weighted and filtered recommendations to a user according to one embodiment of the present invention.

In one particular embodiment of the invention, recommendations are generated based on user item preference data, population preference data that is a summarization of the preference data of all users, and a serendipity control function, as illustrated in FIG. 2. In this embodiment, the recommender system includes three core components: the recommendation engine 202, the serendipity control function applicator 204, and the serendipity integration unit 206.

The outputs of the control function applicator 204 and the recommendation engine 202 feed into the serendipity integration unit 206. The output from the serendipity integration unit 206 is a serendipity-weighted and filtered recommendation for an item. The serendipity- weighted and filtered recommendation may be generated automatically upon receipt of the user item preference data, or may be generated in response to a specific request received from the user, by way of the user input device 118.

The recommendation engine 202 predicts a user's preference for each item in the dataset, without regard to serendipity. The engine builds and maintains an interest profile for each user that occurs in the user preference data. The recommendation engine can then generate recommendations for each user that occurs in the preference data. There are many different techniques for generating personalized recommendations from user interest profiles that the recommendation engine may use. An examples of a technique that may be used to generate recommendations is automated collaborative filtering as described in Resnick Iacovo, Susha, Bergstrom, and Riedl, GroupLens: An open architecture for collaborative filtering of netnews, Proceedings of the 1994 Computer Supported Collaborative Work Conference (1994).

Other recommendation techniques are described in U.S. application Ser. No. 08/725,580, filed Oct. 7, 1996, entitled "System, Method And Article Of Manufacture For Utilizing Implicit Ratings In Prediction Information Systems" now U.S. Pat. No. 6,108,493, U.S. application Ser. No. 08/729, 787, filed Oct. 8, 1996, entitled "System, Method, And Article Of Manufacture For Generating Implicit Ratings Based On Receiver Operating Curves", now U.S. Pat. No. 6,016,475, and U.S. application Ser. No. 08/733,806, filed on Oct. 18, 1996, entitled "System, Method And Article Of Manufacture For Using Receiver Operating Curves To Evaluate Predictive Utility" now U.S. Pat. No. 5,842,199, all of which have been incorporated herein by reference.

In automated collaborative filtering, candidate items for recommendation are generated by matching users who have shared interests in the past into groups. These groups are called affinity groups or neighborhoods. Members of a user's affinity group are called neighbors. To form a neighborhood for a user, the recommendation engine finds the set of people in the preference data who have the profiles most similar to the profile of a user. Similarity between two profiles may be measured by counting the items that are shared by the two profiles.

There are many different methods to form affinity groups, and these methods have been described in the literature published on recommendation engines. In the following paragraphs, one particular method is described that may be used to form affinity groups of users based on user preference data. This is provided only as an example and is not intended to limit the invention to the use of the algorithm specifically described. Other examples of neighborhood formation algorithms may be found in Resnick Iacovo, Susha, Bergstrom, and Riedl, GroupLens: An open architecture for collaborative filtering of netnews, Proceedings of the 1994 Computer Supported Collaborative Work Conference (1994), and Shardanand and Maes Social information filtering: algorithms for automating "word of mouth", CHI '95: Conference proceedings on Human factors in computing systems (1995), both incorporated herein by reference. The recommendation may be made upon receipt of unary, binary, or numerically valued information from the user.

Figure 4:
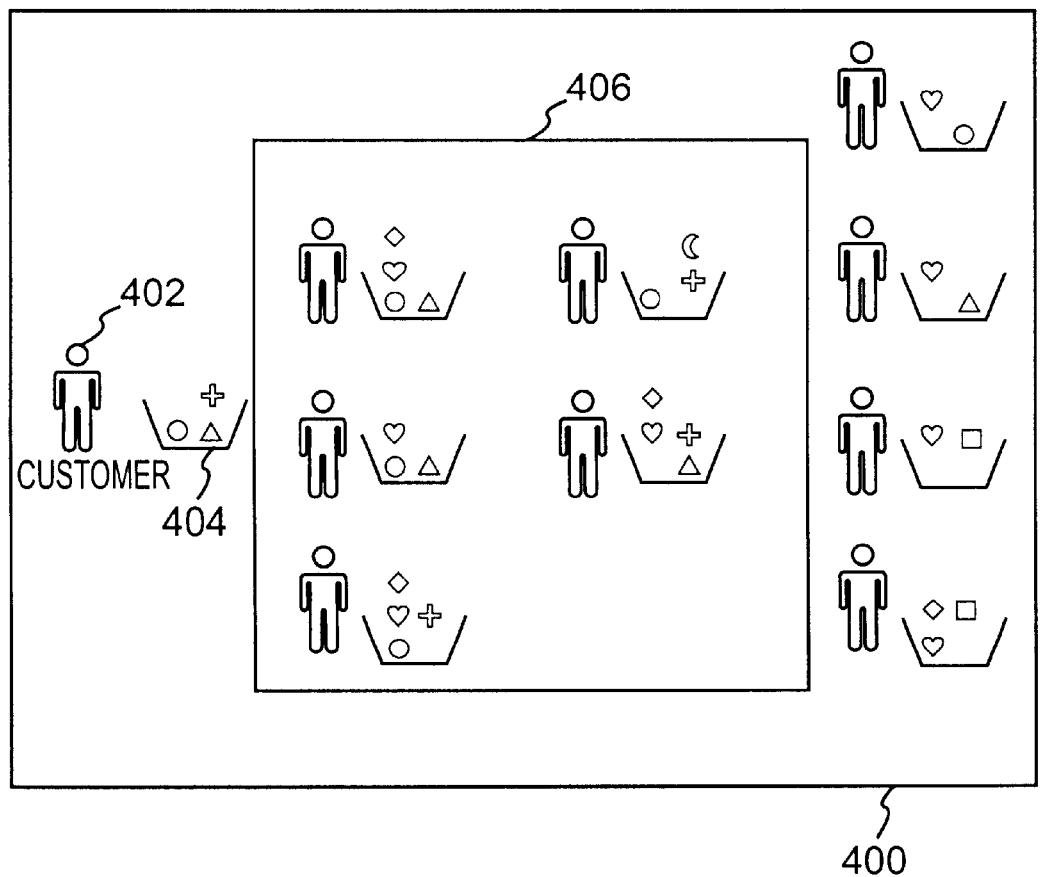
FIG. 4 illustrates an example of a universe of users, including a customer, and user item preference profiles.

FIG. 4 illustrates the formation of a neighborhood through a simple example of an interaction with a recommendation engine. In this example, the recommendation engine has preference information for ten users—shown in the user universe 400. For generality, the items being recommended are represented by geometric shapes, but this does not limit the applicability of the system to other types of items selected by the user. The list of items that a user has selected or purchased (hereinafter simply selected) is called a profile and the preference contains profiles for each of the ten users of the system. The profiles are represented as small "shopping baskets" beside each user that contain pictorial representations of the items that the user has selected.

Recommendation

One 402 of the ten users, referred to herein as the customer, requests recommendations from a recommender system. The recommendation may be returned to the customer in real time.

The customer 402 has selected three items: a circle, a triangle, and a cross. As a result, the customer's profile 404 contains a circle, a triangle and a cross.

To form a neighborhood, the recommendation engine selects the set of users from the user population who have the profiles most similar to the customer's profile. It is important to limit membership in the neighborhood to those neighbors who can contribute positively to a personalized recommendation for the customer. Since user preference data can often contain information for large numbers of users, it is also important to limit the number of users that are selected as neighbors. Therefore, the formation of neighborhoods is controlled primarily by two parameters, namely i) minimum neighbor similarity and ii) maximum neighborhood size. These parameters may be configured by the administrator of the recommendation engine. Minimum neighbor similarity ensures that all members of a neighbor have a minimum number of items in common with the customer before being included in a neighborhood. Configuring the system for a large maximum neighborhood size provides a larger set of items that can be recommended for each user, while a smaller maximum neighborhood size focuses on including only the best neighbors.

In the present example, the minimum neighborhood similarity is set at two shared items, and the maximum neighborhood size is not set (or is set to be equal to the total number of users) because the number of users in the preference data is still small and does not impact on the performance of the recommendation system. As a result, the neighborhood 406 is formed by selecting all the users whose profiles share at least two items with the customer's profile. Therefore the neighborhood is all users who have either: a circle and a triangle; a circle and a cross; or a triangle and a cross. In this case, five users are selected as members of the neighborhood.

Figure 5:
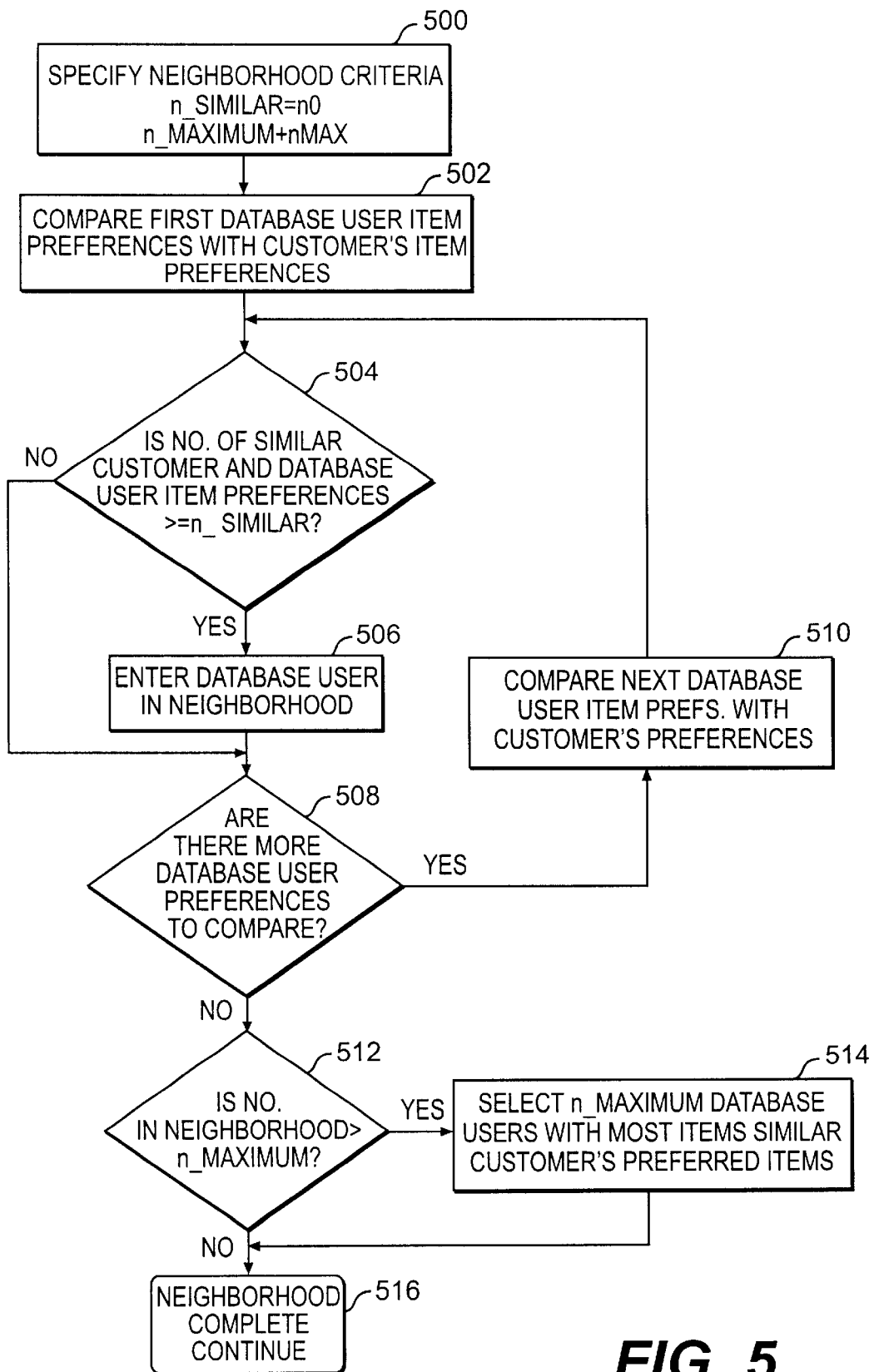
FIG. 5 illustrates a flow chart for one embodiment of a procedure for constructing a neighborhood.
Figure 6E:
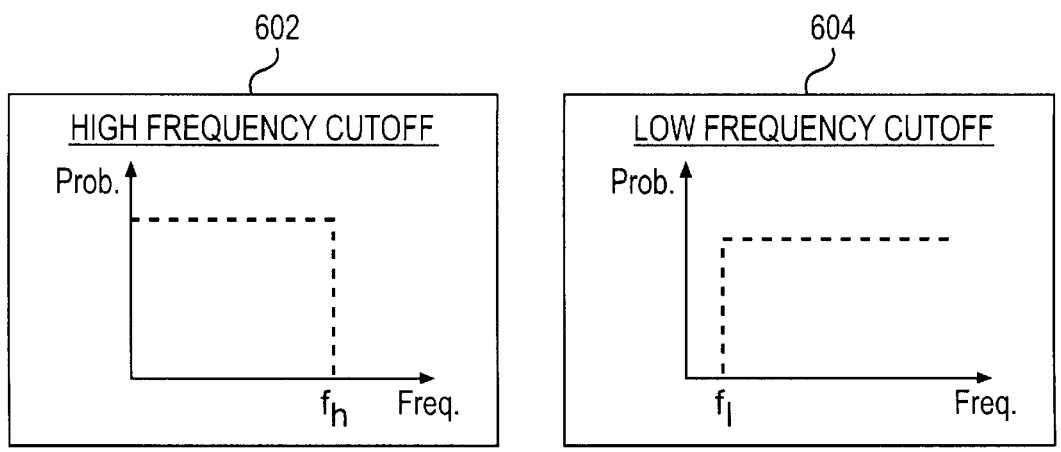
Figure 6E:
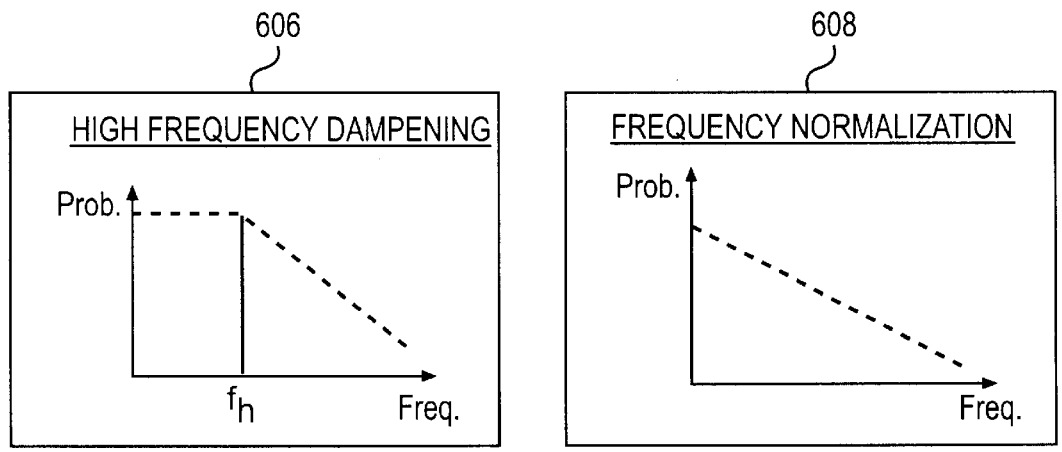
Figure 6E:
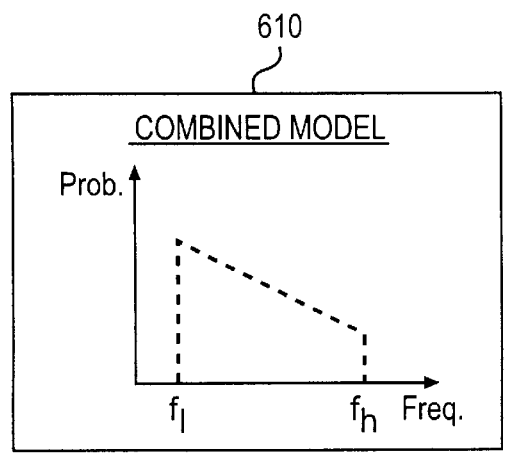

A flowchart shown in FIG. 5 illustrates one embodiment of a procedure to be followed to create a neighborhood. At step 500, the neighborhood criteria are set. For example, this may include setting the minimum number similarity, n_similar, to be equal to n0 (n0=2 in the current example). Also, this may include setting the maximum neighborhood size n_maximum at nmax. The user item preferences of the customer are compared with the preferences of users stored on the database (known as database users), at step 502. The number of similar preferences between the customer's preferences and the database user's preferences are counted, at step 504, and if the number is equal to or higher than n_similar, then that particular database user is entered into the neighborhood, step 506. If there are more database users whose preferences have to be examined, as determined at step 508, then the next database user's preferences are compared with the preferences of the customer, at step 510.

Once the preferences of all the database users have been compared against the preferences of the customer, the neighborhood is examined for size, at step 512. If it is determined that the neighborhood is too large, i.e. that the number of members in the neighborhood exceeds n_maximum, then the n_maximum database users whose preferences are most similar to the preferences of the customer are selected for the neighborhood, in step 514. The neighborhood is now complete, step 516.

Once the neighborhood has been formed, a set of candidate items for recommendation is generated from the neighborhood. The set of candidate items includes all items that occur in profiles of the neighbors but do not occur in the profile of the customer. Eliminating items occurring in the user's profile prevents the recommender system from recommending items that the customer has already selected. The recommendation engine calculates the frequency of occurrence ($f_n$) of each item within the user's neighborhood. The value of $f_n$ for a particular item is that number of neighbor profiles in which the item occurs relative to the number of neighbors in the neighborhood. The recommendation engine outputs the list of candidate items along with their respective frequency of occurrence in the neighborhood.

Figure 7:
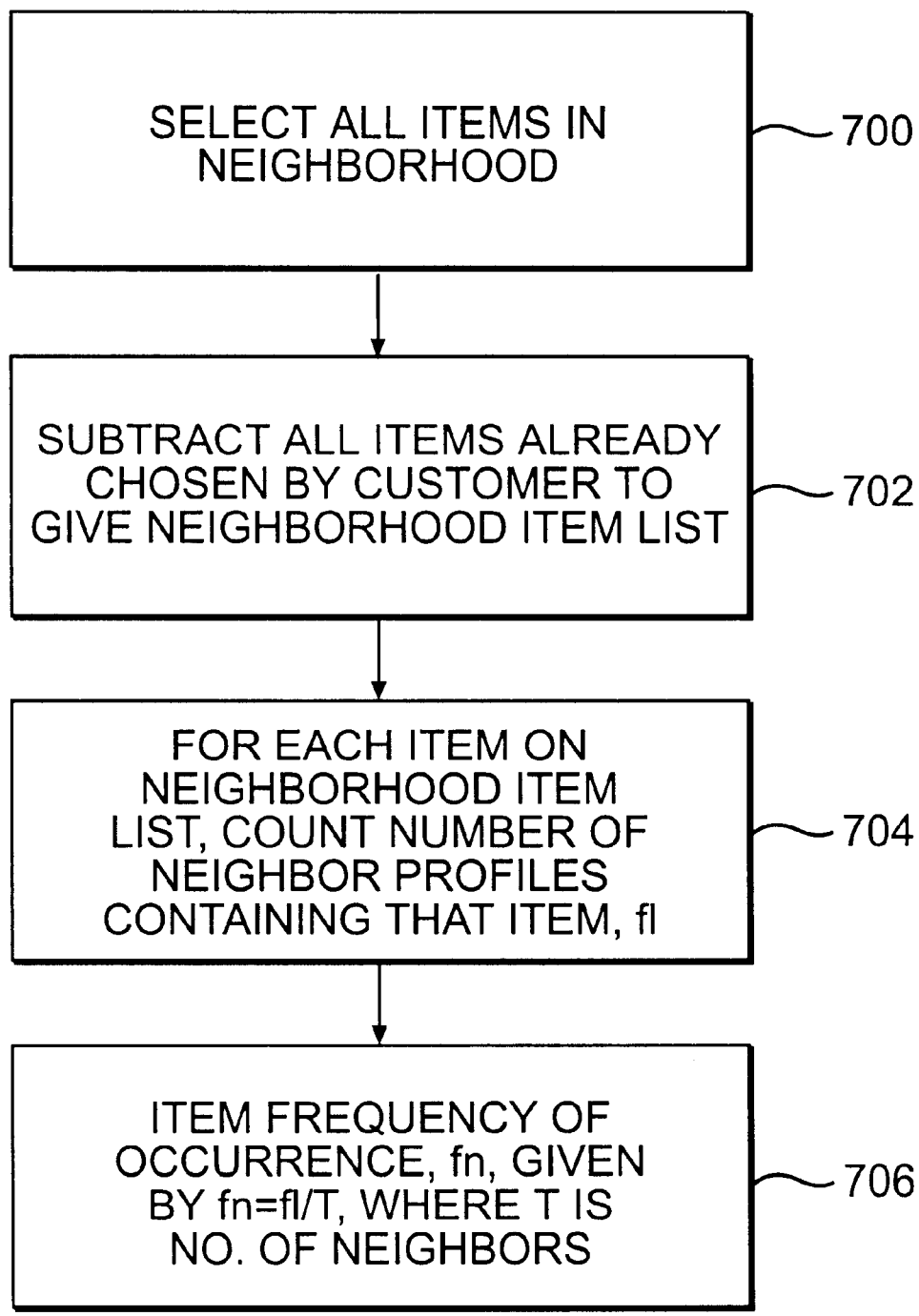
FIG. 7 illustrates a flow chart for one embodiment of a method for calculating item occurrence frequency in a neighborhood.

A flow chart shown in FIG. 7 illustrates a simple procedure for determining $f_n$ for each item. First, all the items in the neighborhood are selected, and then those items for which the customer has already shown a preference are removed from the list if items, step 702, leaving only those items in the neighborhood that the customer has not selected. For each item, the number of neighbor profiles containing that item is counted, at step 704, to give the item frequency, $f_n$. It is assumed that there is a total of total_neigh neighbors profiled in the neighborhood. The item frequency, $f_n$, is therefore given by $f_n = f_i / total\_neigh$ In the illustrated example, circles, triangles, and crosses are not considered for recommendation because they already occur in the customer's profile. However, hearts, diamonds, and crescents occur in the profiles of neighbors but not in the customer's profile. The frequency of occurrence for each is computed and output by the recommendation engine. The computed frequencies for the example are shown in Table I. Note that squares are not considered for recommendation because no squares appear in the customer's neighborhood.

TABLE I

| | NEIGHBORHOOD FREQUENCY |
| --- | --- |
| Item | Frequency of occurrence ($f_n$) |
| Heart | 80% |
| Diamond | 60% |
| Crescent | 20% |

Community Item Popularity

The community popularity data 210 contains data summarizing the overall popularity of different items selected by members of the population 400. The community popularity data 210 may be stored on a memory system and retrieved when a set of serendipity-weighted and filtered recommendations is being calculated. The community popularity data 210 may also be calculated in real-time upon receipt of a request for the data. The community popularity data 210 may then be calculated from the universe of user preference data, as described in the following paragraphs.

Figure 10:
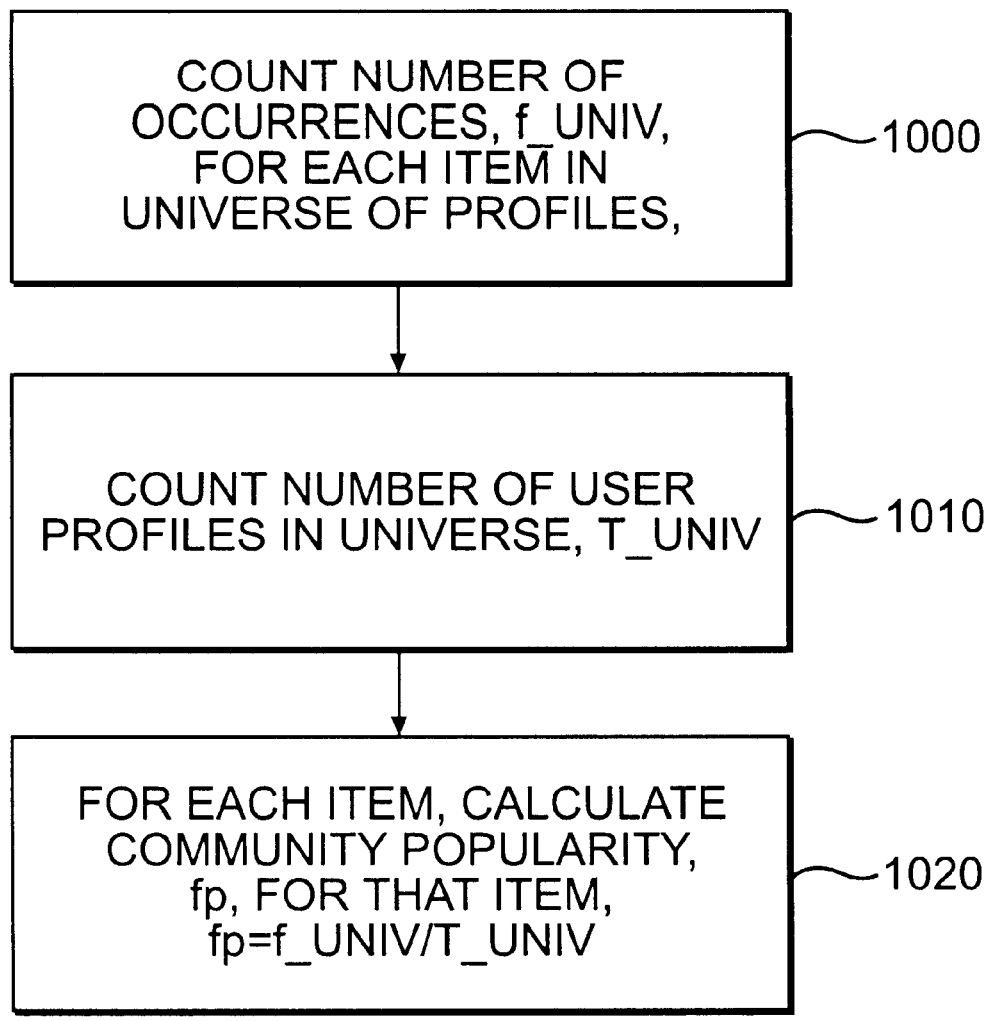
FIG. 10 illustrates one embodiment of a method for calculating community item popularity data.

A flow chart, illustrating one embodiment of a procedure for calculating the community popularity data, is illustrated in FIG. 10. Unlike the recommendation techniques described above, the population of interest in calculating the community popularity data is the whole universe of user profiles, and not only those user profiles which demonstrate a similarity to the customer's profile.

The total number of occurrences, f_univ, in the universe of user profiles is calculated for each item, in step 1000. The total number of user profiles, T_univ, is calculated in step 1010. For each item, the community item popularity, $f_p$, is given by $f_p$=f_univ/T_univ.

In the illustrated example, 10 users have manifested preferences. A subset of eight of the users have chosen hearts, another subset of six have chosen circles, another subset of five have chosen triangles, another subset of four have chosen crosses, another subset of four have chosen diamonds, another subset of two users have chosen squares, and a last subset of one user has chosen a crescent. In this example, the community popularity of an item is described in terms of the frequency of occurrence of that item in all users' profiles. The community popularity data for the present example may be summarized as shown in Table II.

TABLE II

COMMUNITY POPULARITY INPUT

| Item | Popularity ($f_p$) |
|---|---|
| Heart | 80% |
| Circle | 60% |
| Triangle | 50% |
| Cross | 40% |
| Diamond | 40% |
| Square | 20% |
| Crescent | 10% |

Serendipity Control Function

For each item in the community popularity input 210, the serendipity control function applicator 204 computes a serendipity control value by applying a serendipity control function that was input in 212 to each item occurring in community popularity data set 210.

The serendipity control function 212 specifies how community popularity input values 210 are mapped to serendipity control values output from the applicator 204. As just discussed, a community popularity value exists for each item that occurs in the user preference data. In this embodiment, the serendipity control function 212 includes a function that can be specified by the user or by the administrator of the recommender system. The control function may be different for any (user, item) combination, or may be shared over multiple users and items. In the illustrated example, a heart has a community popularity value of 80%.

The serendipity control function may also be received from an external source, for example the system where the community item popularity database is stored, or may be stored in the memory 104, in the secondary storage 108, or selected by the CPU 102 from a number of functions, based on an input received from the user or a system administrator through the user interface adapter 114. The user may direct a request through the user interface adapter 114

The result of applying the serendipity control function to the community popularity value is the production of a serendipity control value for the item, which is a real-numbered value between 0 and 1, with 1 indicating that the item has met the serendipity requirements of the serendipity control function perfectly, and a 0 indicating that the item does not meet the serendipity requirements of the serendipity control function.

The serendipity control function may be any general mathematical function that relates the community popularity, $f_p$, of an item to a probability value, w, where 0<=w<=1. Therefore, where an item occurs with a specific community popularity value, it is assigned a serendipity control value that is dependent on the community popularity value. Where the serendipity control function is seren_fun (x), then the serendipity control value, w, for a specific item is given by:

$w$=seren_fun $(f_p)$

Without limiting the scope of the invention, some common strategies for building serendipity control functions are described as follows, with particular reference to FIGS. 6A–6E.

High frequency cutoff A high frequency cutoff control assigns a 0 to all items with a community popularity value greater than a specified cutoff value, and a 1 to all other items. A graph of a high frequency cutoff control function is shown in 602. Items that are very popular among the entire user base, and hence have a high community popularity value, are likely to be known by the user. Recommending an obvious item is not a useful functionality for a recommender system. The high frequency cutoff function provides a method to prevent popular items from being recommended.

In illustration, consider the community popularity input summarized in Table II. A high frequency cutoff function might be configured to remove from consideration any items that have been purchased by more than 75% of the population, since it is believed that the recommendation of items having a community popularity value higher than 75% does not provide any value to the customer. As a result, the high frequency cutoff function assigns a serendipity control value of 0 to any items with $f_p$ greater than 75%, and a 1 to all other items. In this case, the heart is assigned a value of 0, and all other items are assigned a value of 1.

This function may be calculated using the following:

if $f_p$<0.75 then $w$=1 else $w$=0

Low frequency cutoff A low frequency cutoff function is shown in 604. Items with a community popularity value lower than a specified cutoff value are assigned a value of 0, while all remaining items are assigned a value of 1. This function may be useful in cases where it is desirable not to recommend an item until a certain number of users in the population have selected it. An assumption implicit in this function is that the item has some value per se, and is therefore worth recommending to a user, only if it has been previously selected at least a given minimum number of times.

Again consider the data illustrated in Table II. In the case where a low frequency cutoff function is chosen so that items with $f_p$ less than 15% are discarded, the crescent is assigned a serendipity control value of 0, since its community popularity value is 10%. All other items are assigned a value of 1.

This function may be calculated using the following:

if $f_p$>0.15 then $w$=1 else $w$=0

High Frequency Dampening. This function is illustrated as graph 606, and may be described as a broader variation of the high frequency cutoff function. Like the high frequency cutoff function, this control function assigns a serendipity control value of 1 to items occurring with a community popularity value up to a specified cutoff value. For items occurring with a community popularity value above the specified cutoff value, the control function returns an increasingly smaller value. This function may be used where it is believed that the recommendation of an item is less serendipitous where the item is more popular. However, this function is more forgiving of higher frequency occurrences than the high frequency cutoff function, in that it still allows some items of high community popularity to be assigned a non-zero serendipity control value, albeit at a value less than 1.

This function may be calculated using the following:

if $f_p < f_h$ then $w=1$ else $w=1-(f_p-f_h)/m1$ where $f_h$ represents the community item popularity above which the cut-off commences, and $m1$ determines the slope of the cut-off. It will be understood that of the cut-offs may be employed other than the linear relationship employed in this example.

Frequency Normalization. In this function, a smaller serendipity control value is associated with an item whose occurrence frequency is greater. The control value decreases linearly as the community popularity of the item increases. An example of a frequency normalization function graph is illustrated as curve 608. The frequency normalization curve need not be linear, and may have a different shape, for example an exponential or polynomial relationship to the community popularity value. A frequency normalization function has the advantage that no matter what the community popularity values of two items are, the less popular item will have a stronger value than the more popular item. Also, the frequency normalization function does not eliminate any item entirely from consideration and does not require the specification of defined cutoff values, which may often be different for different sets of data.

A linear frequency normalization function may be given as:

$w=1-f_p/m2$ where $m2$ determines the slope of the normalization.

Dynamically Adapted. A dynamically adapted serendipity control function for a user does not remain constant with time, but changes in response to feedback received from the user. The feedback may be provided as changes explicitly requested by the user, or as information gained by observing the actions of the user. For example, a user may provide an indication of the accuracy of each recommendation given and such indication may be used to identify the level of serendipity that a user appreciates. This in turn may be used to dynamically generate a serendipity control function personalized to that user. For example, where a dynamically adapted function is based on a high frequency cutoff function, the cutoff popularity value may be dynamically controlled. Consequently, the user may control the level of obviousness of the items are that are recommended.

The feedback to control the serendipity function may be implicitly received from the customer. For example, the feedback may be include the rate at which the user accepts the serendipity-weighted and filtered recommendations presented to him or her. Where the recommendations are accepted at a low rate, the serendipity function may be altered to produce a greater number of serendipity-weighted and filtered recommendations. In addition, the feedback may be based on the rate at which the customer requests additional items or the rate at which the customer accepts non-recommended items. If the rate at which the customer accepts non-recommended items is high, say higher than the rate at which he accepts recommended items, the serendipity function may be altered to increase the range of items recommended to the customer.

Mixed function. The characteristics of more than one of the above functions may be desired in a recommender system. To this extent, a mixed function may be used that combines several of the above mentioned functions into a single function. For example, consider the combined function 610. This function represents a combination of high-frequency cutoff, low-frequency cutoff, and frequency normalization. If the community popularity value is below the low cutoff or above the high cutoff, then the function will assign a serendipity control value of 0 to the item. If the item has a popularity value between the low cutoff and the high cutoff, then the frequency normalization function applies, with higher popularity values being assigned lower control values.

It will be appreciated that serendipity control functions, other than those described here, may also be used to reduce the obviousness of items recommended by a recommender system.

Figure 11:
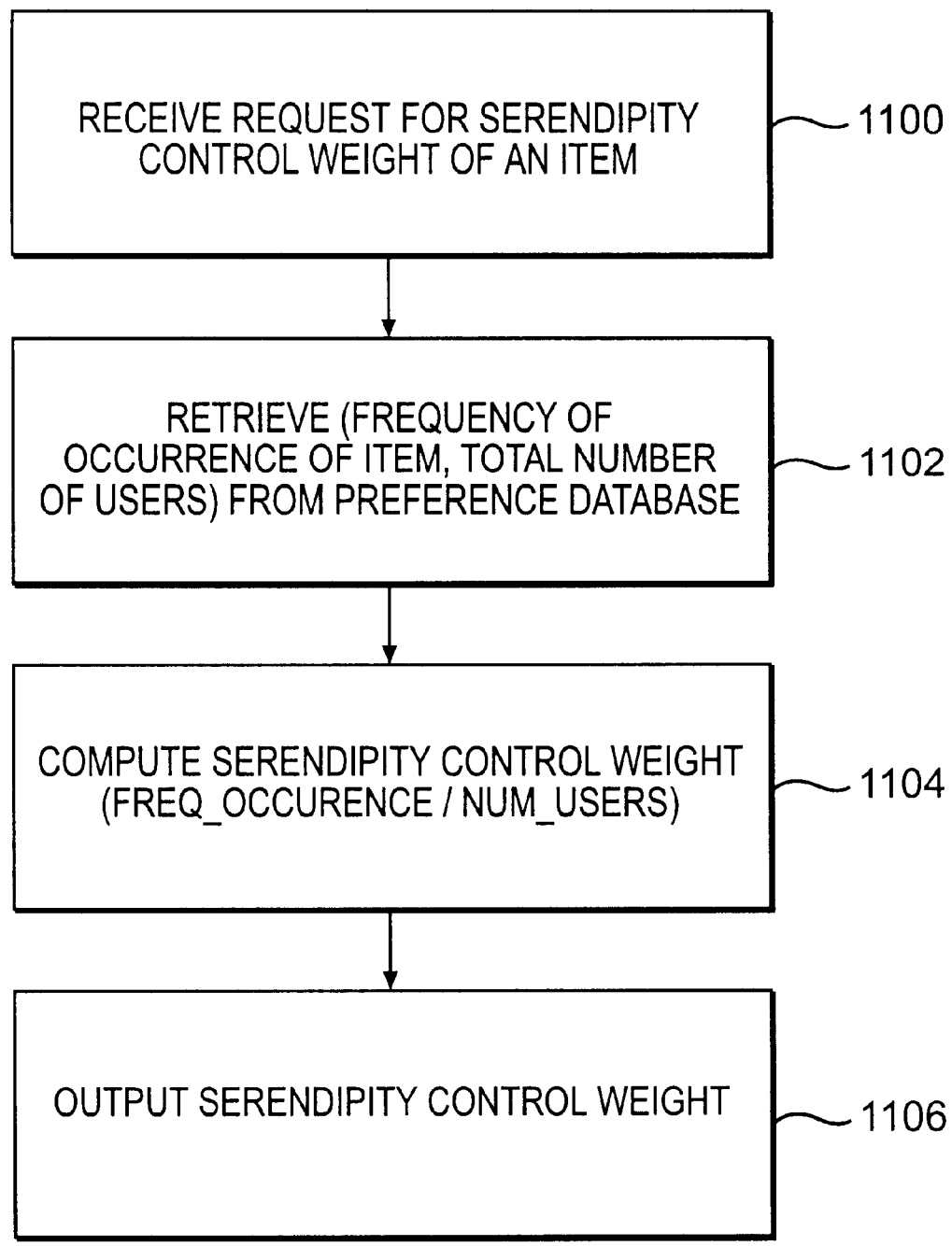
FIGS. 11 and 12 illustrate embodiments of methods for applying serendipity control functions to community item popularity data to produce serendipity control values.

A flow chart showing one embodiment of a method of applying the serendipity control function is illustrated in FIG. 11. In this real-time embodiment of a serendipity control function applicator, the serendipity control value is calculated in response to a request received for a serendipity control value of an item, at step 1100. The frequency of occurrence of the item in the universe of user profiles, f_univ, and the total number of user profiles T_univ are retrieved from a database of user profiles, in step 1102. The community item popularity is determined from f_univ and T_univ, and the serendipity function applied to the community item popularity value to produce the serendipity control value, at step 1104.

The method illustrated in FIG. 11 to generate the serendipity control value may be carried out in a processor that is remote from the processor that calculates the serendipity-weighted and filtered recommendation. Therefore, the serendipity control value may be output to that processor, at step 1106. However, the same processor may also be used both to calculate the serendipity control value and the serendipity-weighted and filtered recommendation. This serendipity control function applicator operates in real-time, calculating the serendipity control value afresh each time there is a request.

Figure 12:
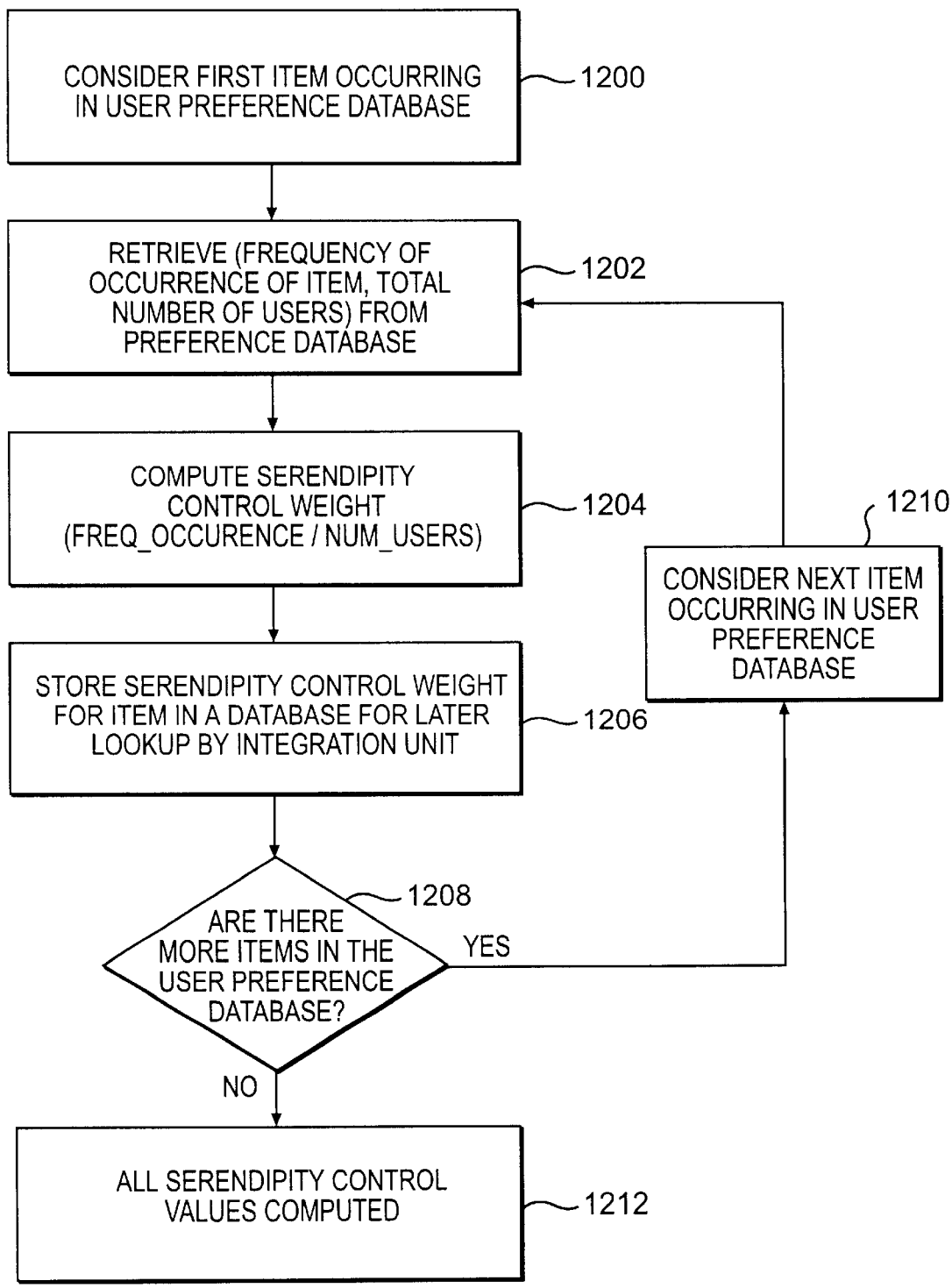

Another method for calculating the serendipity control value is illustrated in flow-chart form in FIG. 12. In this embodiment of a serendipity control function applicator, the serendipity control value is not calculated on demand, as is the case in the embodiment shown in FIG. 11. Instead, the serendipity control value is calculated in advance of such time as it is needed, and is stored on a memory, readily accessible for retrieval. This approach may save processing time compared with the method illustrated in FIG. 11. However, there is a possibility that the community item popularity data used in this method may not be as up-to-date as the community item popularity data calculated in the method of FIG. 11.

In this method, a first item in the user preference database is selected, at step 1200. The frequency of that item's occurrence in the universe of user profiles, freq-occurence, and the total number of user profiles, num_users, are retrieved, and the community item popularity for that item is calculated, at step 1202. The serendipity control value is then calculated from the community item popularity and the serendipity function, at step 1204, and the serendipity control value is stored in a database, available for lookup at a later time, at step 1206. If it is determined, at step 1208, that there are more items to be considered, then the processor selects the next item, at step 1210, and proceeds to calculate and store a serendipity control value for the next item in a similar manner. Once all items have been considered, the database of serendipity control values is complete, step 1212.

This method is suitable for operating in the background, for example when the processor is not being heavily used. In addition, once the serendipity control value database is complete, the serendipity control function applicator may restart, and calculate a new set of control values. However, for applications where the volume is large, and the frequency of occurrence is not expected to vary significantly over time, the serendipity control value database may be updated at less frequent intervals, perhaps daily or weekly.

Considering once more FIG. 2, the serendipity integration unit 206 takes the serendipity control value of an item produced by the control function applicator 204, and the recommendation value of that item produced by recommendation engine 202, and performs a computation to produce a final serendipity weighted recommendation.

Serendipity Integration

The purpose of the serendipity integration unit is to reconcile the prediction accuracy of the recommendation engine and the serendipitous value of the recommendation into a final list of weighted and filtered recommendations. The serendipity integration may be any computation that relates a serendipity control value w and a recommendation value r of an item to a serendipity-weighted and filtered recommendation $r_w$. The recommendations presented to the serendipity integrator may be unary, binary or numerically valued in form. Likewise, the serendipity-weighted and filtered recommendations may also be unary, binary or numerically valued in form.

Some possible serendipity integration strategies include:

Product. $r_w = w*r$. The recommendation produced by the recommendation engine, r, is devalued by the serendipity control value. Items that meet the serendipity requirements perfectly (thus having a value of 1) do not devalue the recommendation at all, and $r_w = r$. Items that do not meet the serendipity requirements at all (having a value of 0) result in a weighted recommendation of 0. Recommendations for items with a control value between 0 and 1 are devalued by an amount inversely proportional to the value of the serendipity control value w.

Consider again the example described in FIG. 4, where the further assumption is made that a low frequency cutoff serendipity control function is being used, and that the low cutoff is set to 15%. From Table I, we see that the recommendation engine produces recommendations for the heart, diamond, and crescent, with recommendation values of 80%, 60%, and 20% respectively. From Table II, we see that the heart and the diamond have community popularity values of 80% and 40% respectively, and therefore the function applicator 204 assigns a serendipity control value of 1 to both the heart and the diamond.

The serendipity integration unit computes serendipity weighted recommendations for the heart and the diamond by applying the product, resulting in weighted and filtered recommendations 80% (1*80%) and 60% (1*60%). The weighted and filtered recommendations in this case are exactly the same as the original recommendations.

However, the crescent has a community popularity value of 10%, which causes the function applicator 204 to assign it a serendipity control value of 0. This causes the integration unit 206 to assign to the crescent a control value of 0, after applying the product. This effectively filters out the crescent from the set of serendipity-weighted and filtered recommendations.

This may further be described mathematically as:

$r_w = r*w$, where $w = 1$ for $f_p >= 0.15$ $w = 0$ for $f_p < 0.15$

Product with cutoff. The serendipity integration unit applies the product as described above, but if the serendipity-weighted and filtered recommendation computed is below a specified cutoff, then the integration unit does not output a recommendation for that item.

This may further be described mathematically as:

$r_w = r*w$, where $w = 1$ for $f_p >= 0.15$ $w = 0$ for $f_p < 0.15$ $r_w >= r_l$ and $r_w = 0$, where with $r_l$ being the low cut-off value for the recommendation.

Product with top n. The serendipity integration unit computes serendipity weighted recommendations for all items, and only outputs recommendations for the items with the n largest weighted recommendations.

Product with cutoff and top n. A combination of the two previously described computations, where first items with weighted recommendations below the cutoff are discarded, and then from the remaining items, the ones with the top n highest weighted recommendations are output. If less than n items remain after discarding those below the cutoff, then weighted recommendations for all the remaining items are output.

Regardless of the computation, the serendipity integration unit outputs a set of serendipity-weighted and filtered recommendations. The set of recommendations may be empty. The serendipity integration unit may sort the weighted and filtered recommendations before returning them to the user, or it may return the weighted recommendations in the order that the recommendation request list was received. The weighted and filtered recommendations are output into a list 214. The list of serendipity-weighted and filtered recommendations may be output through the display adapter 112 for direct display on a display device 116, for example a user's computer screen. The serendipity integrator 206 may also store the set of serendipity-weighted and filtered recommendations to a memory system, for example a secondary storage system 108 so that the user, or system administrator can have access to the set of serendipity-weighted and filtered recommendations at a later time.

Figure 13:
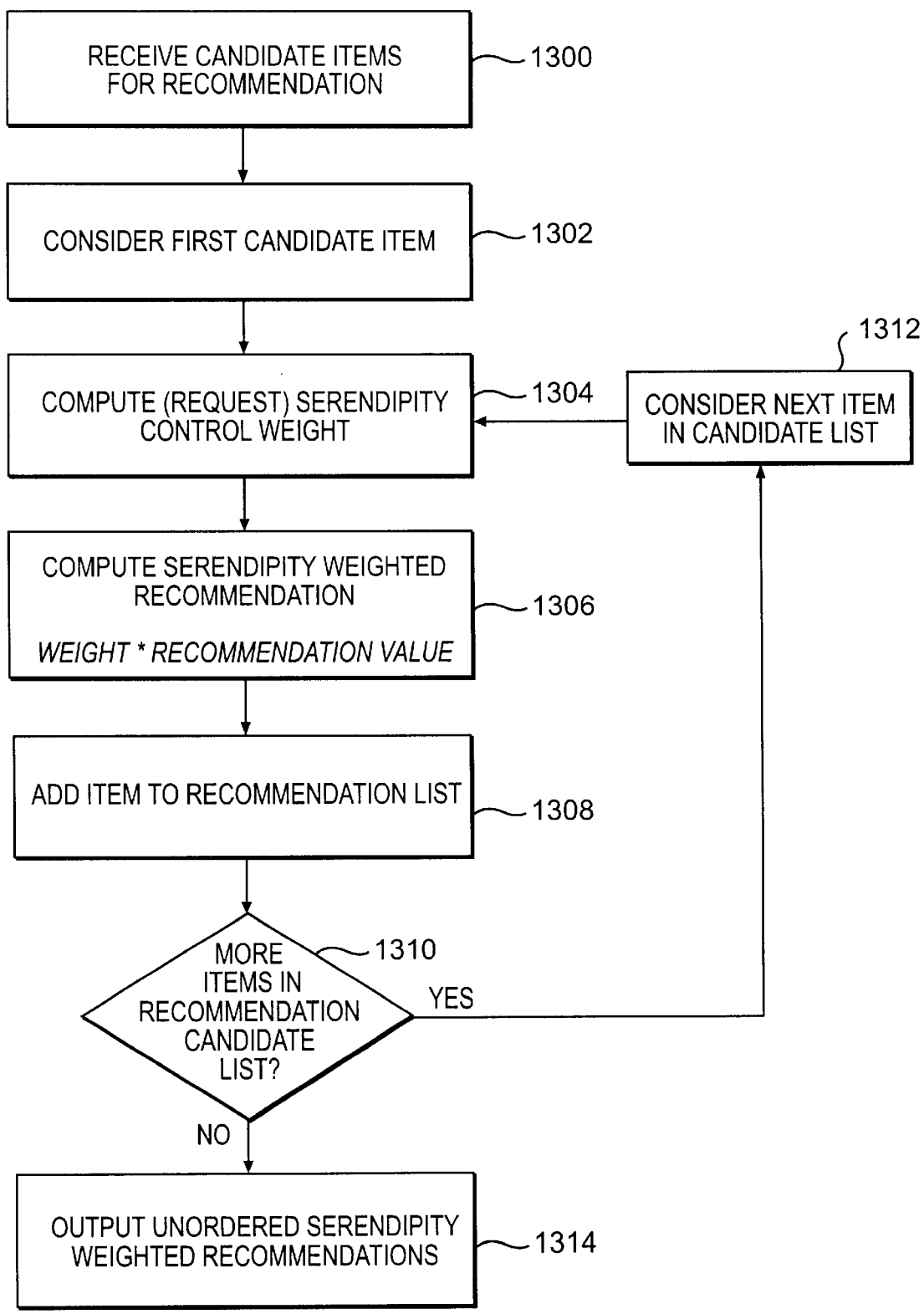
FIGS. 13 and 14 illustrate embodiments of method of integrating serendipity control values with item recommendations.

FIG. 13 illustrates, in flow chart form, one embodiment of a method of operating a processing system, of one or more processors, to produce a set of serendipity-weighted and filtered recommendations. First, a set of item recommendations are received from a recommendation engine 202 at step

1300. The first item in the set of item recommendations is selected, at step 1302, and a request is made for a serendipity control value for the first item, at step 1304. The serendipity control value may be stored in a serendipity control value database, as described earlier with regard to FIG. 12. Alternatively, the serendipity control value may be calculated in real-time, as described earlier with regard to FIG. 11. Once the serendipity control value has been received or calculated, the serendipity-weighted and filtered recommendation is produced by integrating the item recommendation with the serendipity control value, at step 1306, in this case by multiplying the recommendation value by the serendipity control value, and then it is added to the set of serendipity-weighted and filtered recommendations, at step 1308.

If it is determined, at step 1310, that there are more item recommendations to be considered, the processing system selects the next candidate item, at step 1312, and proceeds with the integration process as just described. Once all item recommendations have been considered, the set of serendipity-weighted and filtered recommendations is output to the customer.

Figure 14:
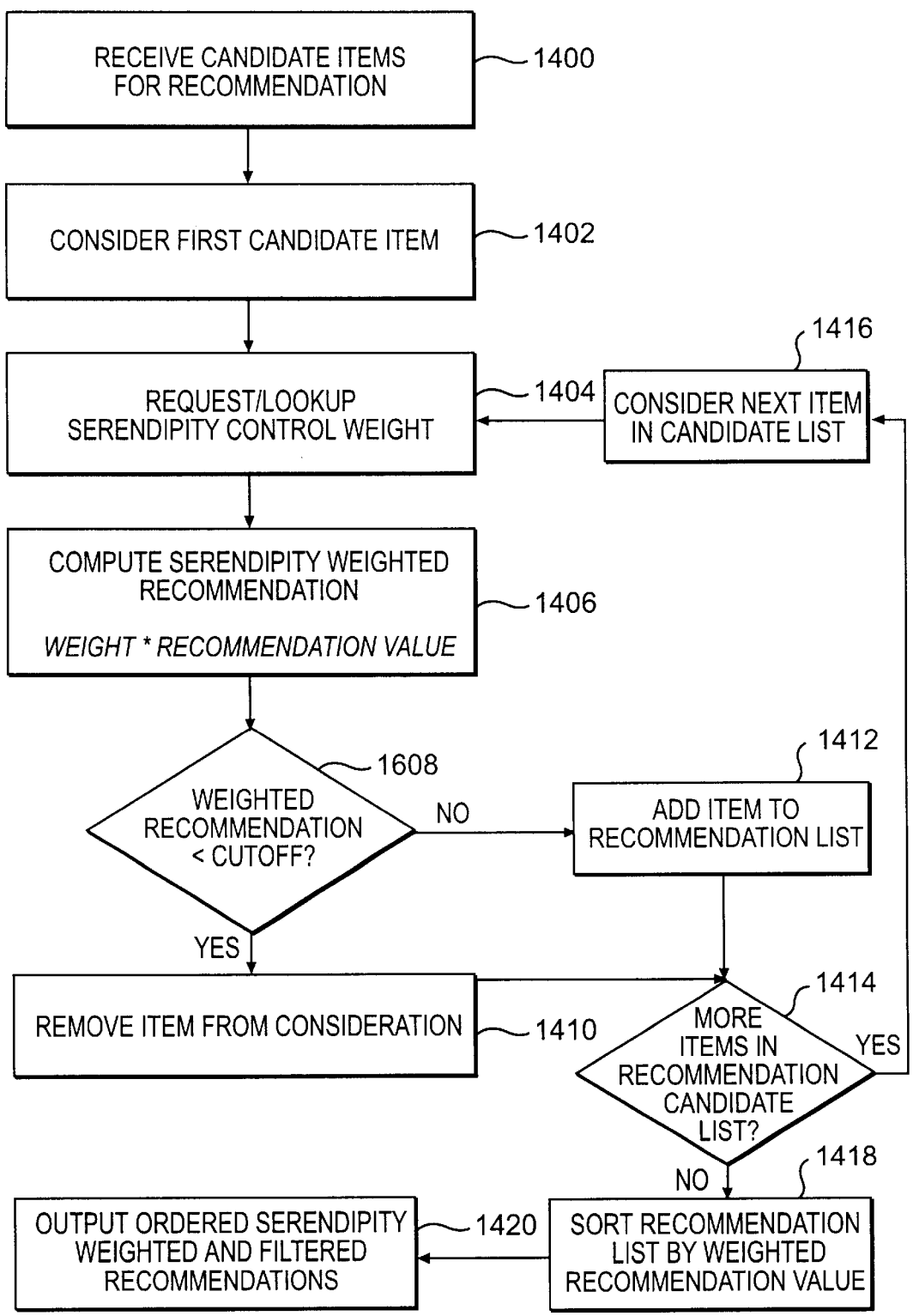

Another embodiment of a method for integrating the serendipity control values with the item recommendation set is illustrated in flow-chart form in FIG. 14. In this embodiment, a set of item recommendations is received from a recommendation engine 202 at step 1400. The first item in the set of item recommendations is selected, at step 1402, and a request is made for a serendipity control value for the first item, at step 1404. As described above with regard to step 1304 in FIG. 13, the serendipity control value may be calculated and delivered in real time, or it may be retrieved from a serendipity control value database. Next, the weighted recommendation is tested against the cut-off value $r_f$. If it is determined that the weighted recommendation is less than the cut-off value, at step 1410, then that item is removed from further consideration. On the other hand, if the weighted recommendation is higher than the cut-off value, then the item is added to the weighted and filtered recommendation list, at step 1412.

If it is determined that there are more items to be considered, at step 1414, the next item candidate is considered in turn, at step 1416. If there are no more item recommendations to consider, the weighted and filtered recommendation list may be sorted, at step 1418, into order of descending weighted and filtered recommendation value, and output for presentation to the user, at step 1420.

Figure 3:
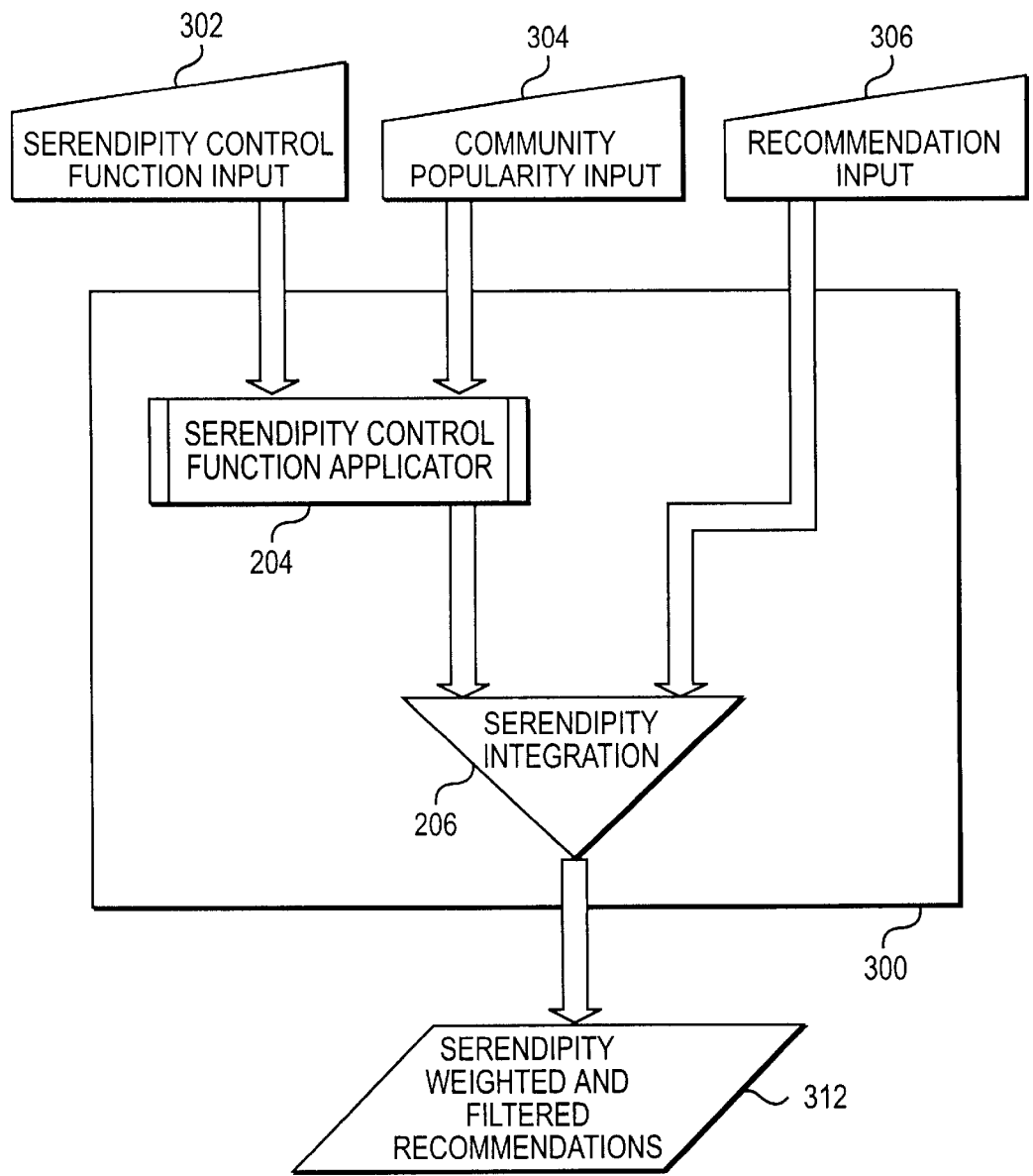
FIG. 3 illustrates a system for generating serendipity-weighted and filtered recommendations to a user according to another embodiment of the present invention.

FIG. 3 depicts a second embodiment of the present invention. This embodiment of a serendipity applicator and integrator 300 is useful for application to a set of recommendation input data 306 produced by a separate recommender system, which may be located on a different processing system than the serendipity control function applicator and/or the serendipity integration unit. The output from the applicator/integrator 300 is a set of serendipity-weighted and filtered recommendations. The recommendation input data 306 may be a set of tuples of the form (user, item, preference value), indicating users' expressed or observed preferences for items. The preference value may be unary, binary, or numerically valued. The recommendation input data may come from any source, including another recommender system that does not support serendipitous recommendations. The community popularity input 304 contains the community popularity values for each item in the recommendation input 306. The serendipity control function applicator 204 computes serendipity control values by applying the serendipity control function input in 302 to the community popularity values 304. The serendipity integration unit 206 combines the recommendation input and the serendipity control values and outputs serendipity weighted and/or filtered recommendations 312.

It should be understood that the present invention is not restricted to operating on a single processor system. For example, in the embodiment illustrated in FIG. 2, the serendipity control function applicator 204 may be located on a different processing system from the serendipity integrator 206, while the recommendation engine 202 may be located on yet another processor. However, any two of these three system elements, the recommendation engine 202, the function applicator, 204 and the integrator 206 may be on one processor with the remaining one being located on a separate processor, or all three 202, 204 and 206 may be on a single processor. In the embodiment illustrated in FIG. 3, the serendipity control applicator 204 and the serendipity integrator 206 may be on different processors that together form a processor system, or may be on a single processor. The recommendation input 306 may be received from a recommendation engine collocated on a processor with the function applicator 204 and/or the integrator 206.

The serendipitous recommender system and the serendipity applicator/integrator have use in many different applications, some of which are described hereinbelow. In order to implement a serendipitous recommender system or a serendipity applicator/integrator, the system administrator devises an appropriate strategy for the serendipity control function, and has access to user preference data. In the following, we list two specific instances of applications of the invention, and then describe different content areas where the invention is useful.

The present invention can be used in different consumer environments, including those where the number of items available for selection by a user is very large. In such an environment, the consumer typically cannot, or will not, spend sufficient time to browse through all of the items in order to determine which item to select.

Figure 8:
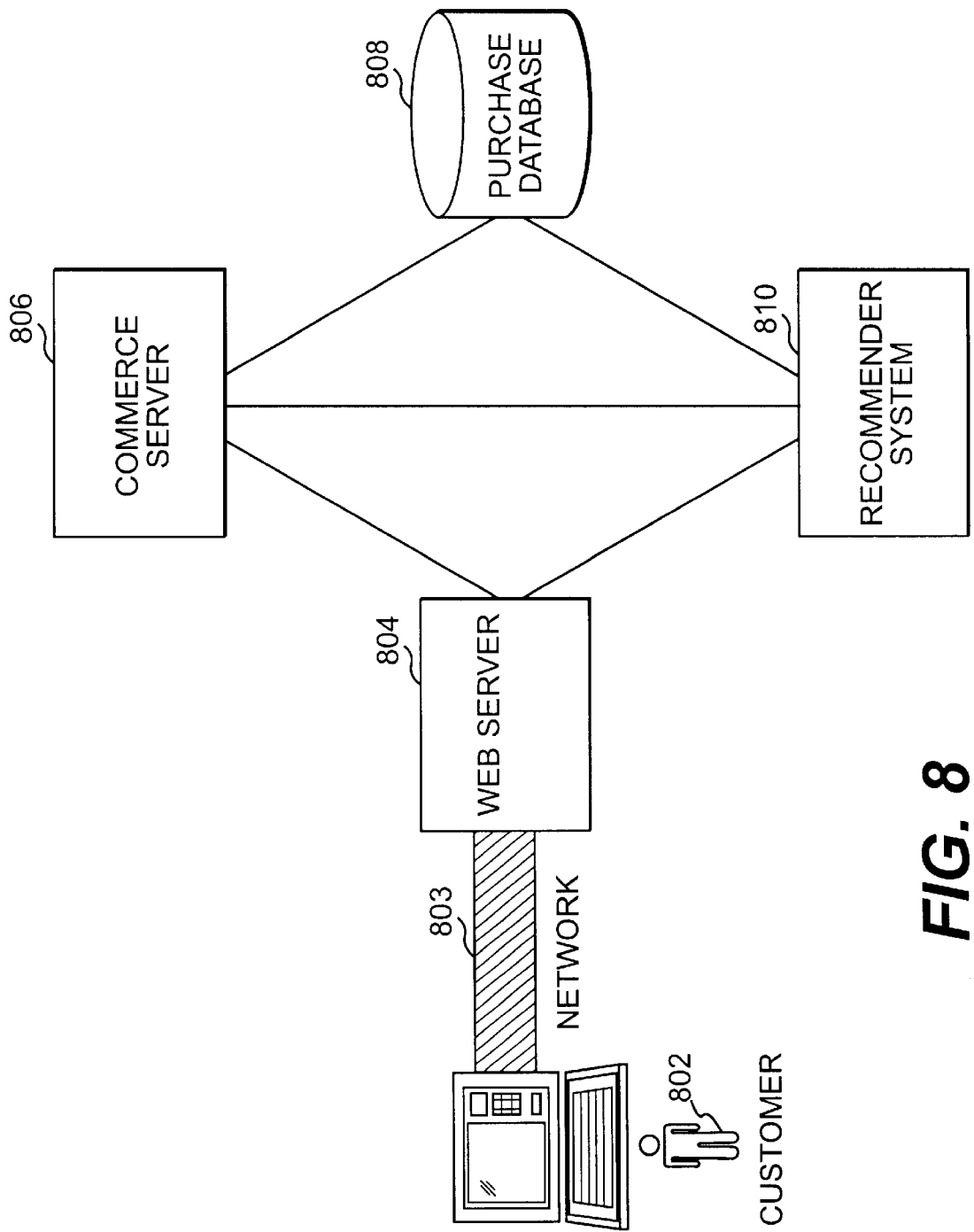
FIG. 8 illustrates an embodiment of an electronic commerce server for use with the invention.

As an example of an application, the invention may be used to augment an electronic commerce server on the Internet. FIG. 8 shows an illustration of a recommender system integrated into a web-based commerce site. The customer 802 connects using a network 803 to a web server 804. A commerce server 806, connected to the web server 804, processes all financial transactions for the customer and contains a database of products for sale. The web server 804 presents this set of products for sale to the customer 802. A purchase database 808, coupled to the commerce server 806, contains records of previous purchases by the customer 802 and other customers.

A serendipity-weighted recommender system 810, coupled to the web server 804, the commerce server 806 and the purchase database 808, receives purchase information from the purchase database 808. The recommender system 810 may also receive explicit ratings from the customer 802 via the web server 804 to predict the customer's preference on recommended items that the customer 802 has not yet purchased. These recommendations may then be used by the web server 804 and the commerce server 806 to provide the customer 802 with specifically targeted content, such as recommendations to purchase specific items, recommendations to view specific items, or targeted advertisements.

As a specific example of a recommender system implemented as described above, consider an web-based book store. The commerce server 806 contains a database of all books available for sale, indexed by ISBN, title, author, and subject. The web server 804 provides a web-based interface that allows the user to locate books of interest in two ways.

If the customer is not looking for a specific book, then the web server can present the user with a list of personalized book recommendations, provided by the serendipity-weighted recommender system 810, with the list of recommendations possibly limited to be within a specific subject, or by a specific author. If the customer is looking for a specific book, then the customer may search by ISBN, title, author, or subject, and when the customer locates the book of interest, the customer may be presented with the serendipity-weighted and filtered recommendation value for that book as a prediction for how much she will like the book. The serendipity-weighted recommender system 808 provides serendipity-weighted and filtered recommendations using the past purchase history of the customer and of other customers, found in the purchase database 808. These recommendations may be provided in real-time. However, to get a more detailed information on the likes and dislikes of the customers, the customer may be asked to provide explicit preference information, such as rating books that she has read. An example of this would be asking customers to rate books on a scale of 1 to 5 with 1 being "awful" and 5 being "excellent." This explicit preference information would be collected by the web server 804 and transmitted to the recommender system 810 to be used as preference information for recommendations.

Figure 9:
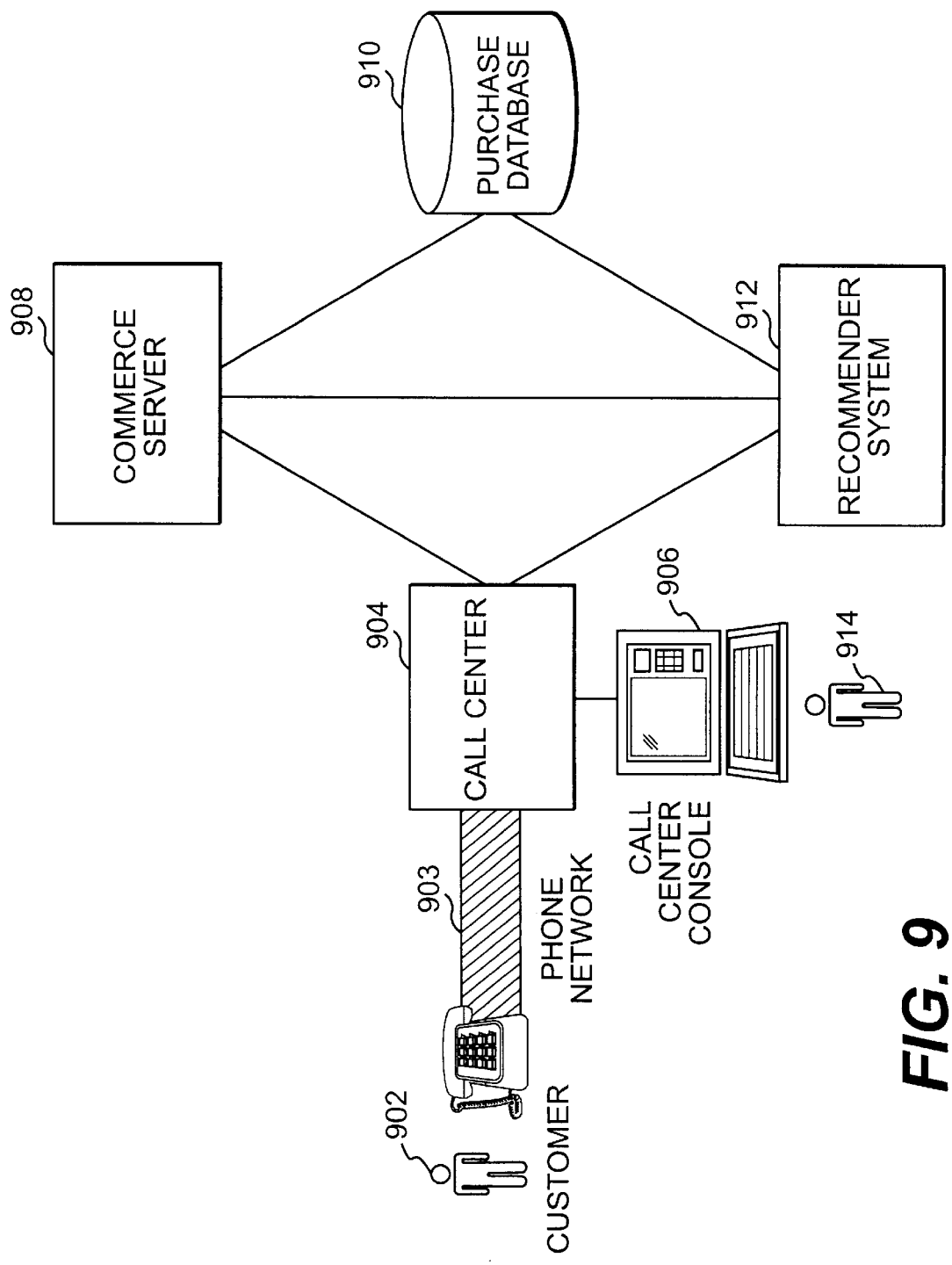
FIG. 9 illustrates an embodiment of a communications system for a phone call center for use with the present invention.

Another application in the generic domain is support for phone call centers. Phone call centers include the computer systems and phone switches used to support operators for organizations that take product orders by telephone. The call center computer systems record and process all phone orders, and may keep customer records of previous orders. FIG. 9 shows a call center implementation that uses the invention. The customer 902 phones into the call center 904, through a telephone network 903, seeking to purchase an item. The customer 902 is connected to an available call center operator, who has access to a call center console 906. A commerce server 908 processes all purchasing and financial transactions, recording purchase information in a purchase database 910. A serendipity-weighted recommender system 912 uses the purchase information stored in the purchase database 910 to generate serendipity-weighted and filtered recommendations for the customer 902. These recommendations are communicated to the call center operator through the call center console. The call center operator may then ask if the customer 902 would be interested in the recommended items. For example, with a phone-in bookstore, the serendipity-weighted recommender system 912 might indicate that the customer is likely to enjoy a specific new release. In offering the recommended item to the customer 902, the call center operator may also offer a discounted price or some other incentive to the user to make a purchase.

Another application of the invention is to predict serendipitous finds in items having audio/visual content. Such items include television programs, movies, radio programs, or a digital media programs. Preference data may be collected by surveying people to learn what programs they currently enjoy, recording which videos they rent from a video store or, in the case of video-on-demand or pay-per-view, recording which programs the user requests. The recommender system recommends new programs that the user may enjoy. Another multimedia content area is music (CDs, tapes, DVDs, etc.). The users may discover musical artists that they would have never originally learned about. A music store may record all music purchases by customers, and use that information as user item preference information. The music store may then provide serendipitous recommendations for new music albums, perhaps in a newsletter or through an information kiosk located in the store or through a web based interface. Still media such as images, pictures, and works of art could also be recommended. The quality and value to a user of such still media varies greatly from person to person. A personalized recommendation from the preferred recommendation system helps a user to locate new images, pictures, and works of art in a way that ensures quality, interest, and serendipity.

Another application area is textual information sources, which includes content collections, such as books or magazines, and other publications. Textual information sources may also include individual articles from magazines, newspapers, or other article publishers, and include Internet documents which are large in number, and variable in quality. With the explosion of electronic textual information databases, there are more such information sources than any one person has the time to consider. A serendipity-weighted recommender system according to the present invention may help a user to expand his or her interests by finding new, high quality publications that they find interesting. The serendipitous quality of the recommender system provides a value to the user that a standard content-based recommender system cannot offer.

In comparison, text and bibliography search engines locate documents that contain certain specified search terms or words. Search engines typically cannot differentiate the same words used in different contexts, and have no concept of the "quality" of a document. Likewise, traditional text search engines have no way of determining the serendipitous value of a textual item. However, a standard search engine may be coupled with the invention to provide serendipitous finds. One possible technique is to have the invention order the list of items returned by a search engine by the serendipitous recommendation value. Therefore, the term "item recommendation data" should be understood to include results, not only from a recommender system, but also from a search engine. Also, the term "recommendation engine" should be understood to cover search engines.

In the marketplace of consumable goods, which includes grocery items, clothing, stationary supplies, and household supplies, there is a large variety of goods and brands available for most items. There is also a large variety of quality, style, and taste among these goods and brands. A supermarket (virtual or physical) may provide the preferred recommender system as a way to help customers locate goods and brands of the appropriate quality, as well as introduce users to new consumable items that they will enjoy that they might not have known about before.

Many supermarkets now provide customers with "shopping club" cards to track individual customer purchases, and to provide customer rewards for frequent shopping. Each customer presents her card at the checkout counter to receive discounts, and the checkout register records all of the items that the customer has purchased. This purchase record may be used as a personal profile for the generation of serendipitous recommendations. The supermarket may then provide the customer with incentives to buy the recommended items by mailing coupons to the customer for those items identified in the set of serendipity-weighted and filtered recommendations.

The invention may also be used to help a user locate services of interest to the user. Many people enjoy variety in dining and entertainment services and are interested in trying new and different restaurants, different meal options at restaurants, new theater shows, and different bars and nightclubs. The invention may be used to enhance the variety of entertainment services using serendipity, while ensuring that only services of interest to the user and of the appropriate quality are recommended. Other services that may be recommended include financial services, real estate, architectural goods or services, travel related goods or services, and automobiles, particularly purchasing, renting and repairing.

Another content domain which may benefit from the invention is computer hardware, software, and hardware/software service products. The hardware/software market is an extremely competitive one. Consequently, there is a large selection of brand alternatives, and a large variance in quality among the brands. Also, many new hardware and software products are introduced each year, often too many for a user to keep track of. The invention has the ability to help a user locate hardware and software brands of interest, as well as locate new hardware and software that the user may not have considered buying before.

Figure 15:
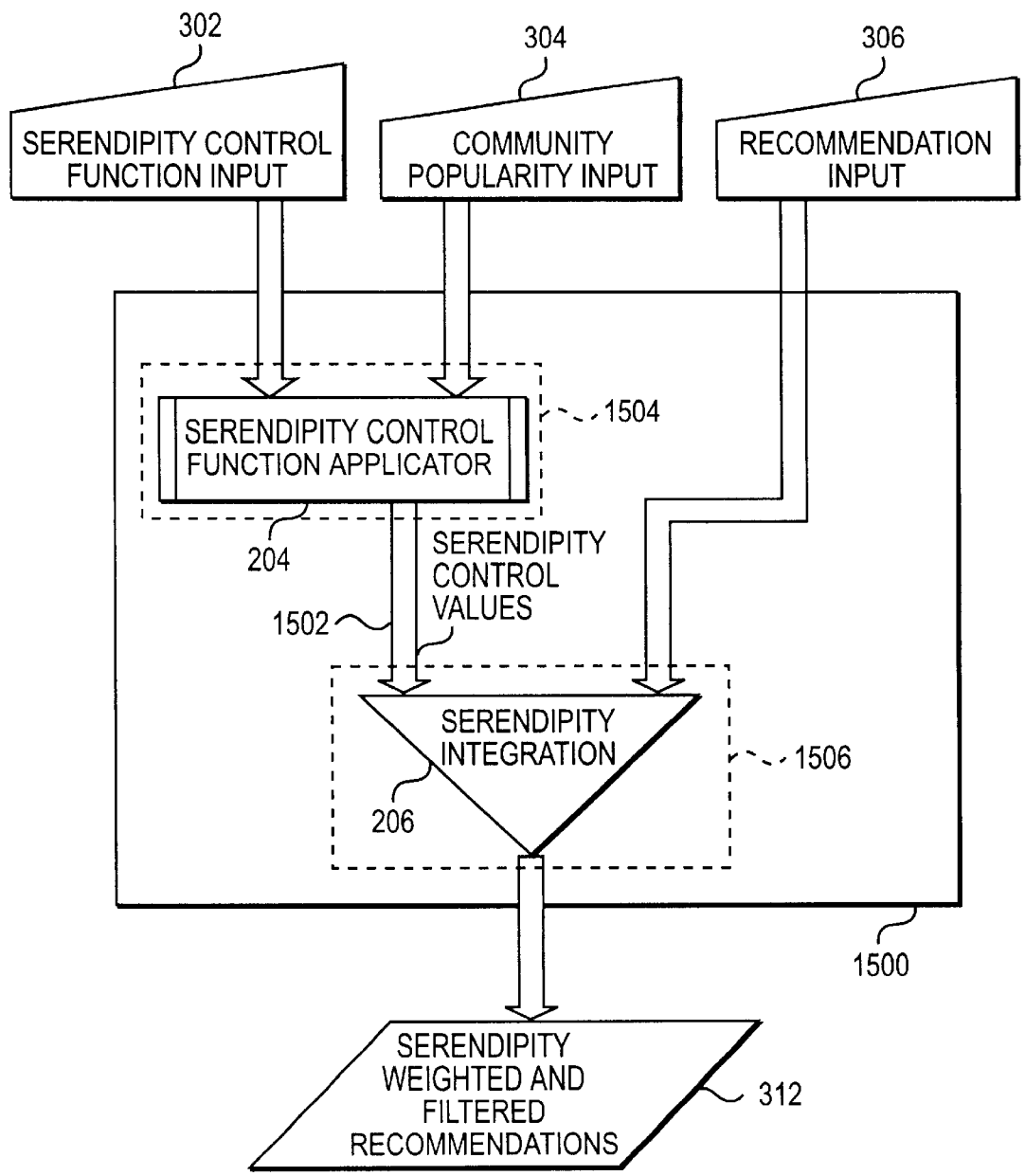
FIGS. 15, 16A and 16B illustrate different embodiments of processing systems configured to carry out the invention While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

Another embodiment of the invention, illustrated in FIG. 15, includes a processing system 1500 of one or more processors configured to receive applicable data including i) item recommendation data 306, and ii) community item popularity data 304. The processing system is configured to produce a set of item serendipity control values 1502 in response to a serendipity function 302 and the community item popularity data 204. The processing system 1500 is also configured to combine the item recommendation data 306 with the set of item serendipity control values 1502 to produce a serendipity-weighted and filtered recommendation output set 312.

The processing system may include only a single processor, or may include a number of different processors. One embodiment of the processing system is illustrated in FIG. 15, where the processing system includes a first processor 1504 (shown in dashed lines) configured to receive the community popularity data 304 and produce the set of item serendipity control values 1502 in response to the serendipity control function 302 and the community popularity data 304. A second processor 1506 (also in dashed lines) is configured to receive the item recommendation data 306 and to combine the item recommendation data 306 with the set of item serendipity control values 1502 to produce the serendipity-weighted and filtered recommendation output set 312. The second processor may be remote from the first processor and coupled to the first processor through a network, the Internet, or some other communications channel.

Figure 16A:
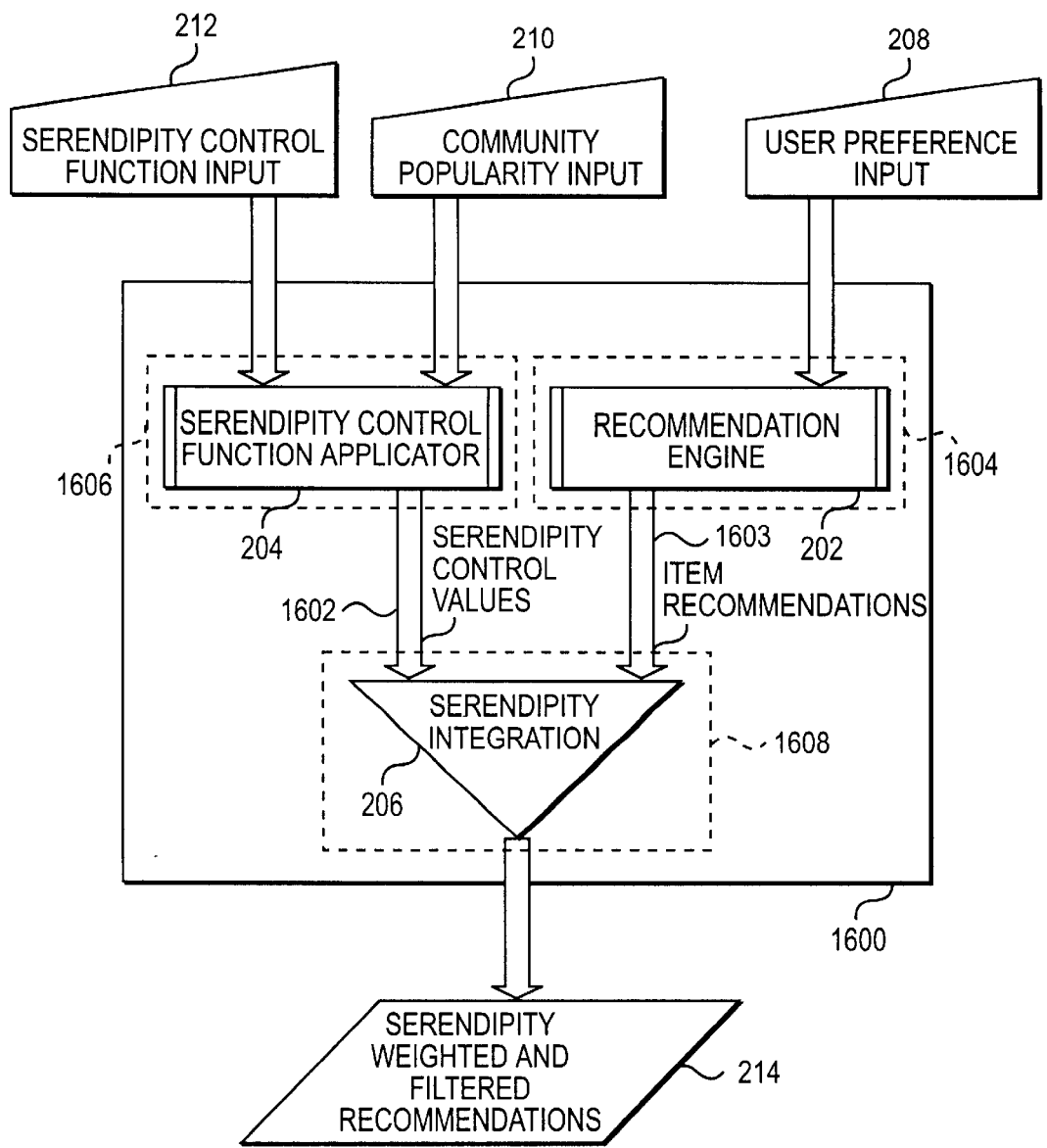

Another embodiment of the invention, illustrated in FIG. 16A, includes a processing system 1600 of one or more processors configured to receive applicable data including i) user item preference data 208, and ii) community item popularity data 210. The processing system is configured to produce 202 an item recommendation set 1603 from the user item preference data 208, to produce a set of item serendipity control values 1602 in response to the serendipity function and the community item popularity data, and to combine the item recommendation 1603 set with the set of item serendipity control values 1602 to produce a serendipity-weighted and filtered recommendation output set 214.

The processing system may be formed form a single processor adapted to perform recommendation 202, serendipity function application 204 and serendipity integration 206. The processing system may also be formed from a number of processors, for example a first processor 1604 (dashed lines) may be configured to receive the user preference data 208 and generate the item recommendation set 1603, while a second processor 1606 (dashed lines) is configured to receive the community item popularity data 210 and the serendipity control function 212, and to generate a serendipity control value 1602. A third processor 1608 (dashed lines) is configured to receive the item recommendation set 1603 from the first processor 1604 and the serendipity control value 1602 from the second processor 1606, and to produce the serendipity-weighted and filtered recommendation output set 214. The processors may all be remote from each other and interconnected through a network, the Internet, or some other communications channel.

Figure 16B:
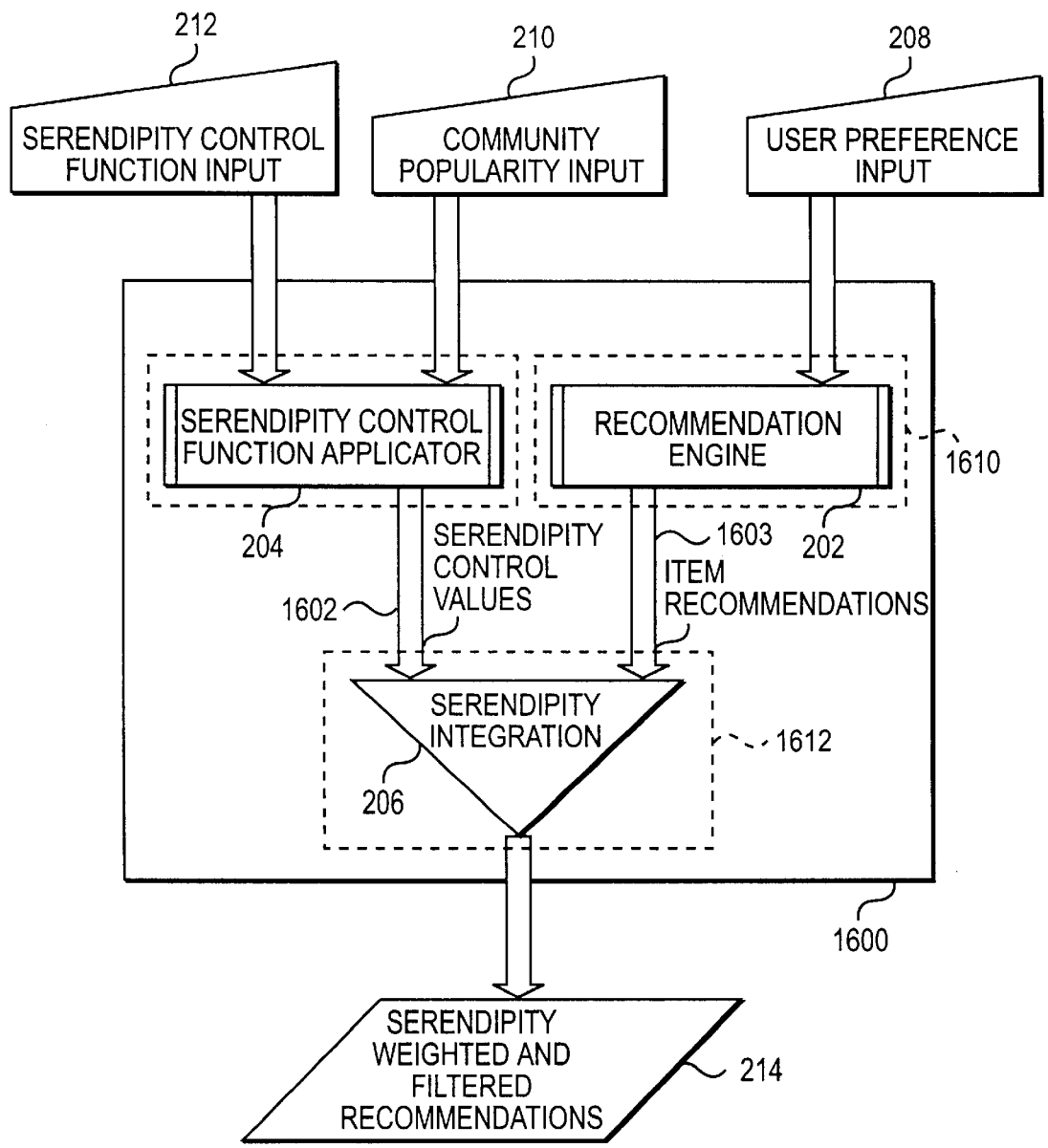

The processing system may also be formed from two processors, for example as illustrated in FIG. 16B. Here, the first processor 1608 is configured to receive the user item preference data 208, the community item popularity data 210 and the serendipity control function 212. The first processor is further configured to produce the item recommendation set 1603 from the user item preference data 208, and to produce a set of serendipity control values from the serendipity function 212 and the community item popularity data 210. The second processor 1612 is configured to combine the item recommendation set 1603 with the set of serendipity control values 1602 to produce the set of serendipity-weighted and filtered recommendations 214.

It will be appreciated that the processing system 1600 may also be formed from other combinations of two processors. For example, a first processor may be configured to perform serendipity function application 204 while a second processor is configured to perform recommendation 202 and serendipity integration 206. In addition, a first processor may be configured to perform the recommendation 202 function while a second processor is configured to perform the serendipity function application and serendipity integration 206 functions. Like the embodiments described above, the processors may be remote from each other and interconnected through a network, the Internet or some other communications channel.

As noted above, the present invention is applicable to recommender systems. It is believed to be particularly useful in permitting recommender systems to produce recommendations that are not only accurate but also of high value to the user, i.e. recommendations that may not be obvious. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. An electronic processing system for generating a serendipity-weighted recommendation output set to a user based, at least in part, on a serendipity function, the system comprising a processing system of one or more processors configured to:
    a. receive applicable data including
        i. item recommendation data, and
        ii. community item popularity data,
    b. produce a set of item serendipity control values in response to the serendipity function and the community item popularity data, and
    c. combine the item recommendation data with the set of item serendipity control values to produce a serendipity-weighted and filtered recommendation output set.

2. A system as recited in claim 1, wherein the processing system is further configured to
a. receive the serendipity control function and
b. produce the set of item serendipity control values in response to the received serendipity function and the community item popularity data.

3. A system as recited in claim 1, wherein the processing system is further configured to
a. receive an input from one of a serendipity filter system administrator and the user relating to the serendipity control function,
b. select the serendipity function in response to the input received from the one of the serendipity filter system administrator and the user, and
c. produce the set of item serendipity control values in response to the selected serendipity function and the community item popularity data.

4. A system as recited in claim 1, further comprising an input interface operatively coupled to the processing system in order to receive the applicable data and transmit the applicable data to the processing system.

5. A system as recited in claim 4, wherein
a. the applicable data further includes the serendipity function,
b. the input interface is configured to be further coupled to a memory system, and
c. the processing system is configured to
   i) receive the serendipity function from the memory system, and
   ii) produce the set of serendipity control values in response to the community item popularity data and the serendipity function received from the memory system.

6. A system as recited in claim 4, wherein
a. the input interface is configured to be further coupled to receive a request from the user for serendipity-weighted and filtered recommendations, and
b. the processing system combines the item recommendation data with the set of item serendipity control values to produce the serendipity-weighted and filtered recommendation output set in response to the request received from the user.

7. A system as recited in claim 4, wherein
the input interface is further configured to receive item recommendation data that includes at least one of unary values, binary values, and numerical values, and
the processing system is further configured to combine the at least one of the unary values, binary values and numerical values with
the set of item serendipity control values to produce the serendipity-weighted and filtered recommendation output set.

8. A system as recited in claim 1, further comprising an output interface operatively coupled to the processing system in order to receive the serendipity-weighted and filtered recommendation output set.

9. A system as recited in claim 8, further comprising a display device operatively coupled to the output interface in order to display the serendipity-weighted recommendation output set.

10. A system as recited in claim 8, further comprising a memory system operatively coupled to the output interface in order to receive and store the serendipity-weighted recommendation output set.

11. A system as recited in claim 1, further comprising a memory system configured to be operatively coupled to the processing system,
wherein the processing system is configured to receive community item popularity data from the memory system.

12. A system as recited in claim 1, further comprising
a) a recommender system configured to be operatively coupled to transmit the item recommendation data to the processing system,
b) wherein the processing system is further configured to combine the item recommendation data received from the recommender system with the set of item serendipity control values to produce the serendipity-weighted and filtered recommendation output set.

13. A system as recited in claim 1, wherein the processing system includes a single processor configured to
a) receive the item recommendation data,
b) receive the community item popularity data,
c) produce the set of item serendipity control values in response to the serendipity control function and the received community item popularity data, and
d) combine the item recommendation data with the set of item serendipity control values to produce the serendipity-weighted and filtered recommendation output set.

14. A system as recited in claim 1, wherein the processing system includes
a) a first processor configured to
   i) receive the community item popularity data, and
   ii) produce the set of item serendipity control values in response to the serendipity control function and the community popularity data, and
b) a second processor, configured to be operatively coupled to the first processor and configured to
   i) receive the item recommendation data
   ii) receive the set of item serendipity control values from the first processor, and
   iii) combine the item recommendation data with the set of item serendipity control values to produce the serendipity-weighted and filtered recommendation output set.

15. A system as recited in claim 1, wherein the processing system is configured to produce the serendipity-weighted recommendation output under real-time, interactive time constraints.

16. A system as recited in claim 1, wherein the processing system is further configured to produce the serendipity-weighted and filtered recommendation output set as at least one of unary, unordered recommendations and priority-ordered recommendations.

17. A system as recited in claim 1, wherein the serendipity function is at least one of:
a) a fixed function having controllable parameters;
b) a bi-level function that excludes items occurring in the community item popularity data with a frequency greater than a pre-selected upper frequency value;
c) a bi-level function that excludes items occurring in the community item popularity data with a frequency less than a pre-selected lower frequency value;
d) a continuous function having a value that reduces with increasing frequency of occurrence in the community item popularity data; and
e) a function assigning a constant value to items having an occurrence frequency in the community item popularity data less than a selected frequency and a value that reduces with an occurrence frequency higher than the selected frequency.

18. A system as recited in claim 1, wherein
a. the processing system is further configured to select the serendipity function using feedback data, the feedback data including one of a rate at which the user accepts items from the serendipity-weighted and filtered item recommendation set, a rate at which the user requests additional predictions, and a rate at which the user accepts non-recommended items, and
b. the processing system produces the set of item serendipity control values in response to the community item popularity data and the serendipity function selected using the feedback data.

19. A system as recited in claim 1, wherein
a. the item recommendation data relate to one of musical items, audio/visual items, written publications, articles from written publications, Internet documents, consumable goods, dining and entertainment services, financial service products, real estate, architectural goods, architectural services, automobile-related goods, automobile related services, travel-related goods, travel-related services, images, pictures, works of art, computer-related hardware, computer software and computer-related service products, and
b. the serendipity-weighted and filtered recommendation output set relates respectively to the one of musical items, audio/visual items, written publications, articles from written publications, Internet documents, consumable goods, dining and entertainment services, financial service products, real estate, architectural goods, architectural services, automobile-related goods, automobile related services, travel-related goods, travel-related services, images, pictures, works of art, computer-related hardware, computer software and computer-related service products.

20. A method of producing a serendipity-weighted recommendation to a user, the method using a computer having a memory unit, a processing system having one or more processors and an input/output interface, the method comprising:
a. receiving, by the processing system, applicable data including inputting,
i. item recommendation data and
ii community item popularity data;
b. generating, using the processing system, a set of item serendipity control values in response to the community item popularity data and a serendipity function; and
c. combining, using the processing system, the item recommendation data and the set of item serendipity control values to produce a serendipity-weighted and filtered item recommendation output set.

21. A method as recited in claim 20, further comprising
a. receiving, by the processing system, the serendipity control function, and
b. generatin the set of item serendipity control values in response to the serendipity control function received by the processing system and the community item popularity data.

22. A method as recited in claim 20, further comprising
a. receiving, by the processing system, an input from one of a serendipity filter system administrator and the user relating to the serendipity control function,
b. selecting, by the processing system, the serendipity function in response to the input received from the one of the serendipity filter system administrator and the user, and
c. producing, by the processing system, the set of item serendipity control values in response to the selected serendipity function and the community item popularity data.

23. A method as recited in claim 20, further comprising receiving, by the input/output interface the applicable data and transmitting the applicable data, by the input/output interface, to the processing system.

24. A method as recited in claim 20, further comprising
a. receiving, with the processing system, the serendipity function from the memory system, and
b. generating, with the processing system, the set of serendipity control values in response to the community item popularity data and the serendipity function received from the memory system.

25. A method as recited in claim 24, further comprising
a. receiving a request, with the processing system, from the user for serendipity-weighted and filtered recommendations, and
b. combining, with the processing system, the item recommendation data with the set of item serendipity control values to produce the serendipity-weighted and filtered recommendation output set in response to the request received from the user.

26. A system as recited in claim 20, further comprising receiving, with the processing system, item recommendation data that includes at least one of unary values, binary values, and numerical values, and
combining, with the processing system, the at least one of the unary values, binary values and numerical values with the set of item serendipity control values to produce the serendipity-weighted and filtered recommendation output set.

27. A method as recited in claim 20, further comprising outputting, using the processing system, the serendipity-weighted and filtered item recommendation output set to the input/output interface.

28. A method as recited in claim 27, further comprising transmitting, using the input/output interface, the serendipity-weighted and filtered recommendation output set to a display device and displaying the serendipity-weighted and filtered recommendation output set on the display device.

29. A method as recited in claim 27, further comprising transmitting, using processing system, the serendipity-weighted and filtered recommendation output set to the memory system for storage therein.

30. A method as recited in claim 20, further comprising receiving, using the processing system, the community item popularity data from the memory system.

31. A method as recited in claim 20, further comprising
a) generating item recommendation data with a recommender system and
b) receiving, by the processing, the item recommendation data generated by the recommender system, and
c) combining the item recommendation data received from the recommender system with the set of item serendipity control values to produce the serendipity-weighted and filtered recommendation output set.

32. A method as recited in claim 20, further comprising
a) receiving the applicable data with a single processor of the one or more processors,
b) producing the set of item serendipity control values with the single processor in response to the serendipity control function and the community item popularity data, and c) combining, with the single processor, the item recommendation data with the set of item serendipity control values to produce the serendipity-weighted and filtered recommendation output set.

33. A method as recited in claim 20, further comprising
a) receiving the applicable data with a first processor of the one or more processors,
b) producing, with the first processor, the set of item serendipity control values in response to the serendipity control function and the community popularity data,
c) receiving the item recommendation data with a second processor of the one or more processors,
d) receiving, with the second processor, the set of item serendipity control values from the first processor, and
e) combining, with the second processor, the item recommendation data with the set of item serendipity control values to produce the serendipity-weighted and filtered recommendation output set.

34. A method as recited in claim 20, further comprising producing, with the processing system, the serendipity-weighted and filtered item recommendation output set under real-time, interactive constraints.

35. A method as recited in claim 20, further comprising producing, with the processing system, the serendipity-weighted and filtered recommendation output set as at least one of unary, unordered recommendations and priority-ordered recommendations.

36. A method as recited in claim 20, further comprising receiving, with the processing system, the item recommendation data as at least one of unary values, binary values, and numerical values.

37. A method as recited in claim 20, further comprising generating, using the processing system, the set of item serendipity control values in response to the community item popularity data and the serendipity function, where the serendipity function is at least one of:
 a fixed function having controllable parameters;
 a bi-level function that excludes items occurring in the community item popularity data with a frequency greater than a pre-selected upper frequency value;
 a bi-level function that excludes items occurring in the community item popularity data with a frequency less than a pre-selected lower frequency value;
 a continuous function having a value that reduces with increasing frequency of occurrence in the community item popularity data; and
 a function assigning a constant value to items having an occurrence frequency in the community item popularity data less than a selected frequency and a value that reduces with an occurrence frequency higher than the selected frequency.

38. A method as recited in claim 20, further comprising
a. receiving, through the input/output interface, a serendipity function selection control input from one of a recommender system administrator and the user, and
b. selecting, using the processing system, the selectable serendipity function in response to the received serendipity function selection control input.

39. A method as recited in claim 20, further comprising controlling the serendipity function, using the processing system, with feedback data received through the input/output interface, the feedback data including one of a rate at which the user accepts serendipity-weighted and filtered recommended items, a rate at which the user requests additional serendipity-weighted and filtered recommendations, and a rate at which the user accepts non-recommended items.

40. A method as recited in claim 20, wherein
a. the item recommendation data relate to one of musical items, audio/visual items, written publications, articles from written publications, Internet documents, consumable goods, dining and entertainment services, financial service products, real estate, architectural goods, architectural services, automobile-related goods, automobile related services, travel-related goods, travel-related services, images, pictures, works of art, computer-related hardware, computer software and computer-related service products, and
b. the serendipity-weighted and filtered recommendation output set relates respectively to the one of musical items, audio/visual items, written publications, articles from written publications, Internet documents, consumable goods, dining and entertainment services, financial service products, real estate, architectural goods, architectural services, automobile-related goods, automobile related services, travel-related goods, travel-related services, images, pictures, works of art, computer-related hardware, computer software and computer- related service products.

41. A computer-readable program storage device, having a set of program instructions physically embodied thereon, executable by a computer, to perform a method for increasing user value of an item recommendation from a recommender system, the method comprising:
a. receiving, by a processing system, applicable data including,
 i. item recommendation data and
 ii community item popularity data;
b. generating, using the processing system, a set of item serendipity control values in response to the community item popularity data and a serendipity function; and
c. combining, using the processing system, the item recommendation data and the set of item serendipity control values to produce a serendipity-weighted and filtered item recommendation output set.

42. A device as recited in claim 41, the method further comprising
a. receiving, by the processing system, the serendipity control function, and
b. generating the set of item serendipity control values in response to the serendipity control function received by the processing system and the community item popularity data.

43. A device as recited in claim 41, the method further comprising
a. receiving, by the processing system, an input from one of a serendipity filter system administrator and the user relating to the serendipity control function,
b. selecting, by the processing system, the serendipity function in response to the input received from the one of the serendipity filter system administrator and the user, and
c. producing, by the processing system, the set of item serendipity control values in response to the selected serendipity function and the community item popularity data.

44. A device as recited in claim 41, the method further comprising receiving, by an input/output interface the applicable data and transmitting the applicable data, by the input/output interface, to the processing system.

45. A device as recited in claim 41, the method further comprising
   a. receiving, by the processing system, the serendipity function from the memory system, and
   b. generating the set of serendipity control values in response to the community item popularity data and the serendipity function received from a memory system.

46. A device as recited in claim 45, the method further comprising
   a. receiving a request, with the processing system, from the user for serendipity-weighted and filtered recommendations, and
   b. combining, with the processing system, the item recommendation data with the set of item serendipity control values to produce the serendipity-weighted and filtered recommendation output set in response to the request received from the user.

47. A device as recited in claim 41, the method further comprising
   receiving, with the processing system, item recommendation data that includes at least one of unary values, binary values, and numerical values, and
   combining, with the processing system, the at least one of the unary values, binary values and numerical values with the set of item serendipity control values to produce the serendipity-weighted and filtered recommendation output set.

48. A device as recited in claim 41, the method further comprising outputting, using the processing system, the serendipity-weighted and filtered item recommendation output set to the input/output interface.

49. A device as recited in claim 48, the method further comprising transmitting, using an input/output interface, the serendipity-weighted recommendation output set to a display device and displaying the serendipity-weighted recommendation output set on the display device.

50. A device as recited in claim 48, the method further comprising transmitting, using the processing system, the serendipity-weighted recommendation output set to the memory system for storage therein.

51. A device as recited in claim 41, the method further comprising
   receiving, using the processing system, the community item popularity data from the memory system.

52. A device as recited in claim 41, the method further comprising
   a) generating item recommendation data with a recommender system and
   b) receiving, by the processing system, the item recommendation data generated by the recommender system, and
   c) combining the item recommendation data received from the recommender system with the set of item serendipity control values to produce the serendipity-weighted and filtered recommendation output set.

53. A device as recited in claim 41, the method further comprising
   a) receiving the applicable data with a single processor of the one or more processors,
   b) producing the set of item serendipity control values with the single processor in response to the serendipity control function and the community item popularity data, and
   c) combining, with the single processor, the item recommendation data with the set of item serendipity control values to produce the serendipity-weighted and filtered recommendation output set.

54. A device as recited in claim 41, the method further comprising
   a) receiving the applicable data with a first processor of the one or more processors and
   b) producing the set of item serendipity control values in response to the serendipity control function and the community popularity data, and
   c) receiving the item recommendation data with a second processor of the one or more processors
   d) receiving, with the second processor, the set of item serendipity control values from the first processor, and
   e) combining, with the second processor, the item recommendation data with the set of item serendipity control values to produce the serendipity-weighted and filtered recommendation output set.

55. A device as recited in claim 41, the method further comprising producing, with the processing system, the serendipity-weighted and filtered item recommendation output set under real-time, interactive constraints.

56. A device as recited in claim 41, the method further comprising producing, with the processing system, the serendipity-weighted and filtered recommendation output set as at least one of unary, unordered recommendations and priority-ordered recommendations.

57. A device as recited in claim 41, the method further comprising receiving, with the processing system, the item recommendation data as at least one of unary values, binary values, and numerical values.

58. A device as recited in claim 41, the method further comprising generating, using the processing system, the set of item serendipity control values in response to the community item popularity data and the serendipity function, where the serendipity function is at least one of:
   a fixed function having controllable parameters;
   a bi-level function that excludes items occurring in the community item popularity data with a frequency greater than a pre-selected upper frequency value;
   a bi-level function that excludes items occurring in the community item popularity data with a frequency less than a pre-selected lower frequency value;
   a continuous function having a value that reduces with increasing frequency of occurrence in the community item popularity data; and
   a function assigning a constant value to items having an occurrence frequency in the community item popularity data less than a selected frequency and a value that reduces with an occurrence frequency higher than the selected frequency.

59. A device as recited in claim 41, the method further comprising
   a. receiving, through an input/output interface, a serendipity function selection control input from one of a recommender system administrator and the user, and
   b. selecting, using the processing system, the selectable serendipity function in response to the received serendipity function selection control input.

60. A device as recited in claim 41, the method further comprising controlling the serendipity function, using the processing system, with feedback data received through an input/output interface, the feedback data including one of a rate at which the user accepts serendipity-weighted and filtered recommended items, a rate at which the user requests additional serendipity-weighted and filtered recommendations, and a rate at which the user accepts non-recommended items.

61. A device as recited in claim 41, wherein
   a. the item recommendation data relate to one of musical items, audio/visual items, written publications, articles from written publications, Internet documents, consumable goods, dining and entertainment services, financial service products, real estate, architectural goods, architectural services, automobile-related goods, automobile related services, travel-related goods, travel-related services, images, pictures, works of art, computer-related hardware, computer software and computer-related service products, and
   b. the serendiptdy-wighted and filtered recommendation output set related respectively to the one of musical items, audio/visual items, written publications, articles from written publications, Internet documents, consumable good, dining and entertainment services, financial service products, real estate, architectural goods, architectural services, financial service products, real estate, related services, travel-related good, travel-related services, images, pictures, works of atr computer-related good, are, computer software and computer-related service products.

* * * * *

UNITED STATES PATENT AND TRADEMARK OFFICE
CERTIFICATE OF CORRECTION

PATENT NO. : 6,321,221 B1
DATED : November 20, 2001
INVENTOR(S) : Paul Bieganski It is certified that error appears in the above-identified patent and that said Letters Patent is hereby corrected as shown below:

<u>Title page,</u>
Item [57], ABSTRACT,
Lines 23 and 24, "medium having a having a" should read -- medium having a --.

<u>Column 23,</u>
Line 56, "generatin" should read -- generating --.

<u>Column 26,</u>
Line 24, "computer- related" should read -- computer-related --.

<u>Column 30,</u>
Line 1, "serendiptdy-wighted" should read -- serendipity-weighted --.
Line 2, "related" should read -- relates --.
Line 5, "good" should read -- goods --.
Lines 7 and 8, "financial service products, real estate, related services," should read -- automobile-related goods, automobile related services, --.
Line 9, "good" should read -- goods --.
Line 10, "atr computer-related good, are," should read -- art, computer-related hardware, --.

Signed and Sealed this

Twenty-third Day of April, 2002

*Attest:*

JAMES E. ROGAN
*Attesting Officer*     Director of the United States Patent and Trademark Office